(12) United States Patent
Bhatt

(10) Patent No.: US 9,424,799 B2
(45) Date of Patent: Aug. 23, 2016

(54) ON-SCREEN IMAGE ADJUSTMENTS

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 801 days.

(21) Appl. No.: 13/284,757

(22) Filed: Oct. 28, 2011

(65) Prior Publication Data

US 2013/0106899 A1 May 2, 2013

(51) Int. Cl.
*G06F 3/0488* (2013.01)
*G09G 5/02* (2006.01)
*G06F 3/0489* (2013.01)

(52) U.S. Cl.
CPC .............. *G09G 5/02* (2013.01); *G06F 3/04897* (2013.01); *G09G 2320/0666* (2013.01); *G09G 2354/00* (2013.01)

(58) Field of Classification Search
CPC ............ G06F 3/04845; G06F 3/04847; G06F 3/0488; G09G 2320/0606; G09G 2320/0626–2320/0673
USPC ................................ 345/594; 715/863, 864
See application file for complete search history.

(56) References Cited

U.S. PATENT DOCUMENTS

| | | | |
|---|---|---|---|
| 7,199,793 B2 | 4/2007 | Oh et al. | |
| 7,657,119 B1 | 2/2010 | Georgiev et al. | |
| 7,701,464 B1* | 4/2010 | Gilra | 345/594 |
| 7,978,938 B1 | 7/2011 | Wilensky | |
| 2002/0112180 A1 | 8/2002 | Land et al. | |
| 2005/0204305 A1* | 9/2005 | Keely et al. | 715/781 |
| 2006/0069603 A1* | 3/2006 | Williams | G06F 3/0482 715/834 |
| 2006/0238655 A1 | 10/2006 | Chou | |
| 2008/0062443 A1* | 3/2008 | Olson | 358/1.9 |
| 2009/0146961 A1 | 6/2009 | Cheung et al. | |
| 2009/0231356 A1 | 9/2009 | Barnes et al. | |
| 2009/0288044 A1 | 11/2009 | Matthews et al. | |
| 2011/0074809 A1 | 3/2011 | Chen et al. | |
| 2012/0036434 A1* | 2/2012 | Oberstein | 715/702 |

OTHER PUBLICATIONS

PCT Notification of Transmittal of the International Search Report and the Written Opinion for Application No. PCT/US2012/057969 dated Jan. 28, 2013, 10 pages.
International Preliminary Report on Patentability in International Application No. PCT/US2012/057969, issued Apr. 29, 2014, 7 pages.

* cited by examiner

*Primary Examiner* — Aaron M Richer
(74) *Attorney, Agent, or Firm* — Fish & Richardson P.C.

(57) ABSTRACT

Methods and systems are described to adjust colors of digital images by using color control tools overlaid on the digital images to be adjusted. In one aspect, a method includes displaying, within a graphical user interface (GUI) and superimposed on a digital image being manipulated, a color control tool configured to cause change of a selected color within the digital image in accordance with user input specifying movement within the GUI. The color control tool includes a plurality of new color indicators, each indicating a new color to which the selected color will change in response to an associated predetermined movement within the GUI. The method also includes receiving via the color control tool user input specifying a direction of movement within the GUI relative to the plurality of new color indicators, and changing the selected color to match the new color indicator associated with the specified direction of movement.

17 Claims, 12 Drawing Sheets
(10 of 12 Drawing Sheet(s) Filed in Color)

ON-SCREEN IMAGE ADJUSTMENTS

BACKGROUND

This specification relates to performing on-screen image adjustments, for example, to adjust colors of digital images by using color control tools overlaid on the digital images to be adjusted.

An image processing application can receive a request from a user associated with the application to modify a color of a portion of a digital image. For example, the image portion can represent a human face, a portion of sky, grass, and the like. In some cases, the user can request to modify the saturation of the image portion's color, in other cases the user can request to change the hue of the image portion. The image processing application configured to perform these and other user-requested color adjustments can provide the user respective color controls through which to receive user input of the desired color saturation, hue, etc. The respective color controllers can be laid out in a graphical user interface (GUI), associated with the image processing application, adjacent to a panel of the GUI configured to display the adjusted digital image, and optionally along with an additional panel configured to display the unadjusted digital image. Such a graphical user interface associated with the image processing application is typically presented to the user on a large computer display.

SUMMARY

Systems and techniques described in this specification can be used, among other ways, to intuitively and easily adjust colors in a digital image. In this fashion, users of image processing applications operated in accordance with the described technologies, among other potential benefits, can apply color effects, preset adjustments or both to digital images without having to know about color saturation, color temperature, hue or other notions of color science. Additionally, the described technologies optionally can be integrated in a non-intrusive manner in a GUI of an image processing application running on mobile devices, for which display real-estate tends to be at a premium. For example, the described technologies provide a color control tool that can be superimposed on a portion of the digital image selected by a user for color adjustment, such that the color control tool contains indicators of available color effects and preset adjustments. In this manner, the user can provide input selecting both a color effect and its magnitude to be applied by the image processing application to the selected image portion by using the color control tool superimposed on the image portion to be modified. Typically, each of the available color effects and preset adjustments represents a predefined combination that includes at least two color transformations.

In general, one aspect of the subject matter described in this specification can be implemented in methods that include the actions of presenting, within a graphical user interface (GUI), a digital image including a plurality of colors, and receiving user input selecting a color within the digital image. The methods further include the actions of displaying within the GUI, and superimposed on the digital image, a color control tool configured to cause change of the selected color within the digital image in accordance with user input specifying movement within the GUI. The color control tool includes a plurality of effect indicators, each indicating a color effect or preset adjustment from among a plurality of respective color effects and preset adjustments to be applied to the selected color in response to an associated predetermined movement within the GUI. Furthermore, the methods include actions of receiving via the color control tool user input specifying a direction of movement within the GUI relative to the plurality of effect indicators, and changing the selected color using a color effect or preset adjustment indicated by the effect indicator associated with the specified direction of movement.

The foregoing and other implementations can each optionally include one or more of the following features, alone or in combination. In some implementations, each of the plurality of effect indicators can include an associated new color indicator indicating a new color to be obtained when applying the color effect or preset adjustment to the selected color in response to the associated predetermined movement in the GUI. Each of the plurality of effect indicators further can include a label of the color effect or preset adjustment to be applied in response to the associated predetermined movement in the GUI. In other implementations, each of the plurality of effect indicators can include a label of the color effect or preset adjustment to be applied in response to the associated predetermined movement in the GUI, without including the associated new color indicator indicating the new color to be obtained when applying the color effect or preset adjustment to the selected color.

In some implementation, the methods can include the actions of updating the digital image display in real time to show a result of changing the selected color in response to the received user input via the color control tool. In some implementations, the user input received via the color control tool further specifies a length of the movement within the GUI relative to the plurality of effect indicators, such that a magnitude of the change in the selected color is determined based on the specified length of the movement. Changing the selected color using the color effect or preset adjustment indicated by the effect indicator associated with the specified direction of movement can be performed while the specified length of the movement is between first and second predefined lengths. For example, the methods can include the actions of indicating that the first predefined length of the specified movement has been reached by removing the plurality of effect indicators except for the effect indicator associated with the specified direction of movement. As another example, the methods can include the actions of indicating that the second predefined length of the specified movement has been reached by removing the effect indicator associated with the specified direction of movement. Further, prior to removing the effect indicator associated with the specified direction of movement, the methods can include the actions of gradually fading the displayed color control tool as the specified length of the movement increases from the first predefined length to the second predefined length.

Another aspect of the subject matter described in this specification can be implemented in methods that include the actions of displaying, within a GUI and superimposed on a digital image being manipulated, a color control tool configured to cause change of a selected color within the digital image in accordance with user input specifying movement within the GUI. The color control tool includes a plurality of new color indicators, each indicating a new color to which the selected color will change in response to an associated predetermined movement within the GUI. The methods also include the actions of receiving via the color control tool user input specifying a direction of movement within the GUI relative to the plurality of new color indicators, and changing the selected color to match the new color indicator associated with the specified direction of movement.

The foregoing and other implementations can each optionally include one or more of the following features, alone or in combination. In some implementations, the methods can include the actions of updating the digital image display in real time to show a result of changing the selected color to match the new color indicator associated with the received user input via the color control tool. In some implementations, the methods also can include the actions of receiving user input selecting the color to be changed using the color control tool, such that displaying the control tool is performed in response to the received user input selecting the color. In some implementations, the methods further can include the actions of detecting one or more colors of the digital image for which color effects and preset adjustments are available, and marking the detected one or more colors to indicate to the user that the marked one or more colors can be changed, such that the user selected color is from among the marked one or more colors.

In some implementations, for each one of the plurality of new color indicators, the new color indicated by the one new color indicator can be obtained from the selected color by applying an associated color effect or preset adjustment of a plurality of color effects and preset adjustments corresponding to the plurality of respective new color indicators. Each one of the plurality of color effects and preset adjustments can include two or more color transformations that are combined in an associated predefined proportion. The two or more color transformations combined in the associated predefined proportion can include either of gamma, luminance, saturation, contrast or brightness adjustments.

Other implementations of this aspect include corresponding computer systems, apparatus, and computer programs recorded on one or more computer storage devices, each configured to perform the actions of the methods. A system of one or more computers can be so configured by virtue of software, firmware, hardware, or a combination thereof installed on the system that, in operation, cause the system to perform the actions. One or more computer programs can be so configured by virtue of having instructions that, when executed by data processing apparatus, cause the apparatus to perform the actions.

Another aspect of the subject matter described in this specification can be implemented in a system that includes a display device, at least one processor and storage configured to store instructions that, when executed by the processor, cause the system to perform operations including presenting, within a GUI on the display device, a digital image including a plurality of colors. The operations further include receiving user input selecting a color within the digital image, and displaying within the GUI, and superimposed on the digital image, a color control tool configured to cause change of the selected color within the digital image in accordance with user input specifying movement within the GUI. The color control tool includes a plurality of new color indicators, each indicating a new color to which the selected color will change in response to an associated predetermined movement within the GUI.

The foregoing and other implementations can each optionally include one or more of the following features, alone or in combination. In some implementations, the operations can further include receiving via the color control tool user input specifying a direction of movement within the GUI relative to the plurality of new color indicators, and changing the selected color to match the new color indicator associated with the specified direction of movement. Furthermore, the received user input selecting the color within the digital image can include an indication of an image pixel having the selected color, and changing the selected color can be performed only within a contiguous portion of the image including the indicated pixel. In some implementations, the displayed color indicator tool is superimposed on a portion of the image that includes the selected color.

In some implementations, the associated predetermined movement within the GUI, responsible for changing the selected color to the new color, can correspond to application of an associated color effect or preset adjustment to the selected color. In addition, the associated color effect or preset adjustment can include a predefined combination of two or more color adjustments. For example, the two or more color adjustments associated with the predefined combination are either of gamma, luminance, saturation, contrast, brightness or saturation adjustments. Additionally, the operations can include accessing, from among a plurality of color effects and preset adjustments stored on the storage, multiple color effects, preset adjustments or both applicable to the selected color. Further, the operations can include populating the color control tool with respective multiple new color indicators corresponding to the accessed multiple color effects, preset adjustments or both applicable to the selected color, and concurrently displaying a predefined quantity of the multiple new color indicators that populate the color control tool. Furthermore, the operations can include accessing, from among a plurality of color effects and preset adjustments stored on the storage, a predefined quantity of color effects, preset adjustments or both applicable to the selected color, and concurrently displaying the predefined quantity of multiple new color indicators corresponding to the accessed multiple color effects, preset adjustments or both applicable to the selected color. Moreover, the plurality of new color indicators can be distributed radially around a reference location, such that (i) a direction of the associated predetermined movement with respect to the reference location represents selection of the applied color effect or preset adjustment, and (ii) a length of the associated predetermined movement represents a magnitude of the applied color effect or preset adjustment.

Particular implementations of the subject matter described in this specification can be configured so as to realize one or more of the following potential advantages. A color adjustment utility enables an end-user to adjust the color of a digital image in an intuitive and visual manner, for example, without having to understand arcane color-theory notions such as hue or saturation (which tend to be non-intuitive and unfamiliar to most users.) In addition, the color adjustment utility can superimpose a color control tool on the digital image being manipulated, without having to dedicate a portion of the GUI associated with the color adjustment utility to the color control tool. The color control tool can include multiple new color indicators such that each one of the multiple new color indicators indicates a new color to which a color selected by the user will change in response to a user selection of the one of the multiple new color indicators. In this fashion, the user of the disclosed color adjustment utility can visualize, side-by-side with the selected color, output colors of multiple available color effects and preset adjustments. Hence, the color adjustment utility allows, among other things, the user to select, in a visual and intuitive way, a desired new color from among the multiple new colors indicated by the color control tool.

Optionally, upon receiving the user selected new color to which the user selected color will be changed, the color adjustment utility can remove from view unselected new color indicators of the color control tool. By doing so, the color adjustment utility can reduce clutter and increase a fraction of the manipulated digital image that is unobstructed by the color control tool. In addition, as it changes from the original user-selected color to the new user-selected color, the color adjustment utility optionally can cause the new color indicator associated with the user selected new color to gradually fade out-of-view. In this manner, the color adjustment utility can present to the viewer a manipulated digital image that is essentially unobstructed by the color control tool.

Details of one or more implementations of the described subject matter are set forth in the accompanying drawings and the description below. Other features, aspects, and potential advantages will become apparent from the description, the drawings, and the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 2A-2J show aspects of an on-screen image adjustment environment. The FIGS. 2A-2J are presented in color.

Like reference numbers and designations in the various drawings indicate like elements.

DETAILED DESCRIPTION

Figure 1:
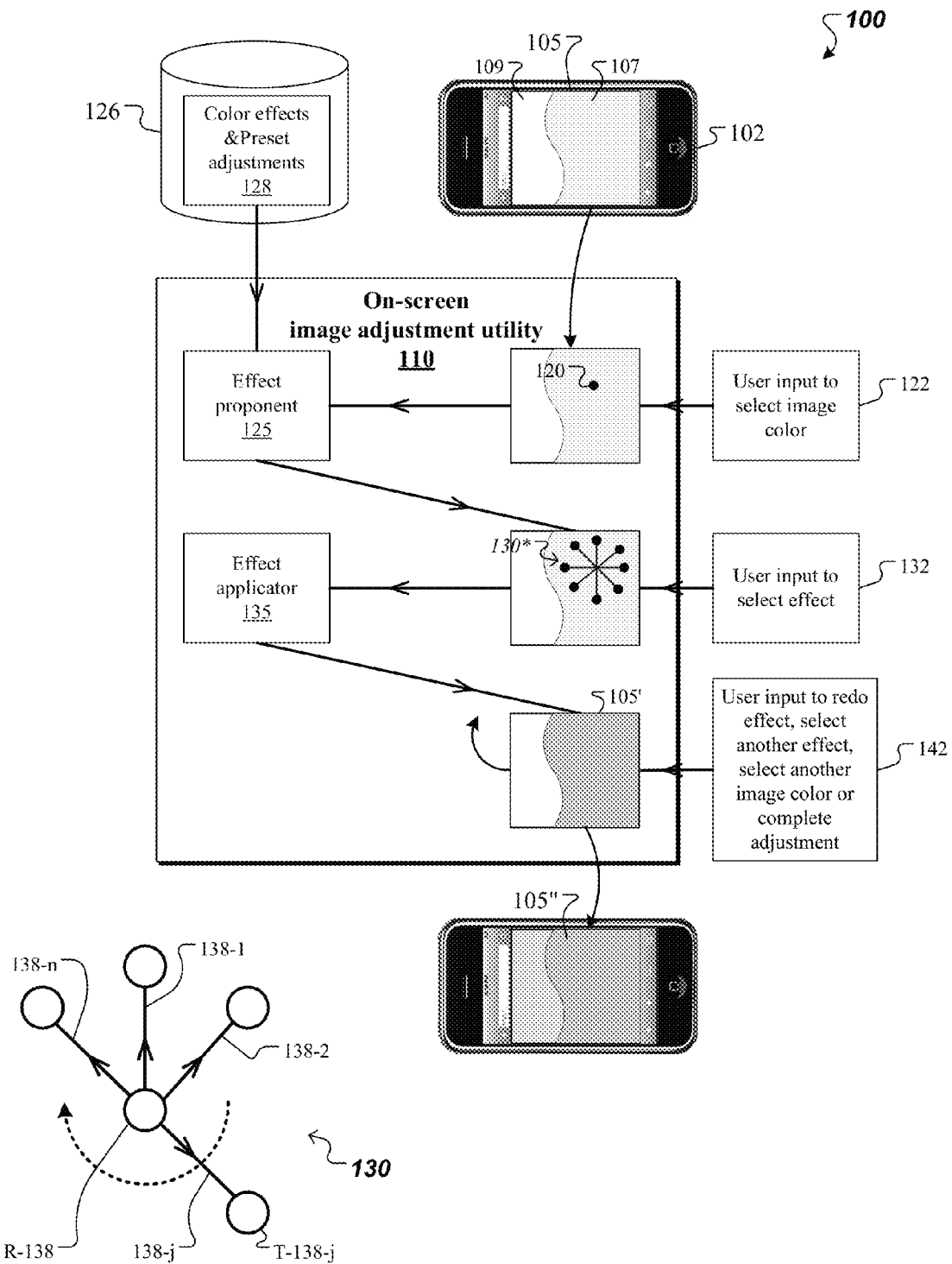
FIG. 1 illustrates an example of a system that includes an on-screen image adjustment environment.

FIG. 1 illustrates an example of a system 100 that includes an on-screen image adjustment environment. The system 100 can be implemented as part of an image processing application executed by a computer system. The computer system can be a mobile device 102. Examples of mobile devices that can be part of the system 100 are cellular telephones, smartphones, personal digital assistants (PDAs), mobile computers (e.g., tablet computers, laptops, and the like), digital cameras, media players or combinations of these. The system 100 can include a graphical user interface (GUI) that displays a digital image 105 including a plurality of colors. The GUI can provide controls and indicators to be used by a user associated with the image processing application for specifying how to process the displayed image. The system 100 can also include a plurality of utilities that carry out under-the-hood processing of the displayed image.

The plurality of utilities of the system 100 can include an on-screen image adjustment utility 110. The on-screen image adjustment utility 110 can access the digital image 105 displayed by the mobile device 102 and can receive a sequence of instructions for processing the displayed image 105. The sequence of instructions can begin with a selection of a color 122 of the displayed image 105, can continue with one or more selections of color effects or preset adjustments or both 132 to be applied to the selected color, and can end with an instruction to complete 142 the application of the selected effect to the selected color. The user can enter the requests 122, 132 and 142 via multi-touch gestures or keyboard/mouse instructions. In general, the instructions received by the on-screen image adjustment utility 110 are processed by various modules therein to allow a user associated with the system 100 to evaluate one or more color changes of the displayed image 105 prior to committing the applied color effects, preset adjustments or both to the final, adjusted image 105". In FIG. 1, these various modules include an effect proponent module 125 configured to propose color effects and preset adjustments that are applicable to the selected color of the image 105 and an effect applicator module 135 configured to apply to the displayed image 105 one or more of the color effects, preset adjustments or both selected by the user from among the proposed color effects and preset adjustments. Aspects relating to the functionality of the on-screen image adjustment utility 110's modules are illustrated in FIGS. 2A-2J. For example, an image processing application 200 described below in connection with FIGS. 2A-2J can correspond to the system 100.

In FIG. 1, the displayed digital image 105 includes a first image portion 107 having a first color, and another image portion 109 having a second color. In some implementations, both of the first and second image portions can be contiguous (as shown in FIG. 1.) For example, the first image portion 107 can correspond to a person's skin and the second image portion 109 can represent grass. In other implementations, the first image portion can be contiguous, and the second image portion can be dis-contiguous. In an example of a digital image 205 illustrated in FIG. 2A, the first (contiguous) image portion can correspond to the Arc de Triomphe, and the second (dis-contiguous) image portion corresponds to the sky, visible around and within the Arc. In some other implementations, both first and second image portions can be dis-contiguous. For example, in an image of FC Barcelona's home jersey, the first portion of the image can represent the cherry stripes of the jersey, and the second portion of the image can represent the navy stripes of the jersey. In general, a color corresponding to one of the image portions can be selected by a user of the image processing application to be improved/enhanced. Accordingly, the user can use the on-screen image adjustment utility 110 to output a visually pleasing digital image 105" either by modifying the selected color within the entire corresponding image portion (whether the latter is contiguous or not), or by modifying the selected color only within a contiguous part of the corresponding image portion, such that the part includes an image location at which the user has selected the color.

Figure 2A:
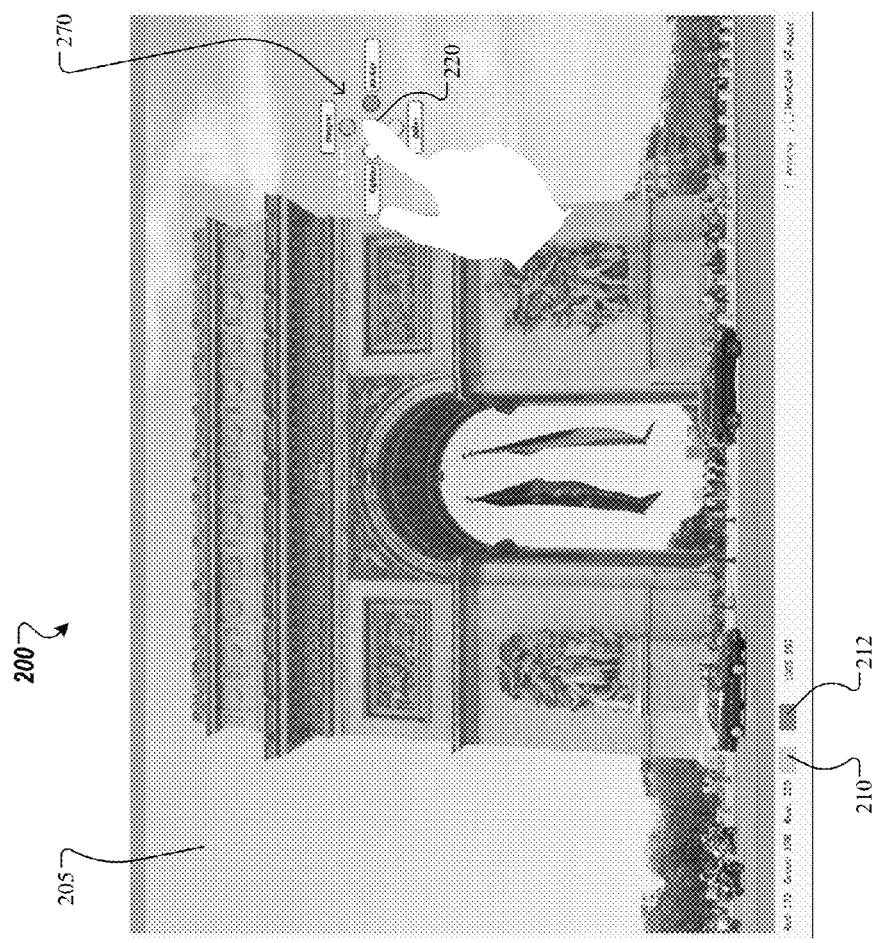

The on-screen image adjustment utility 110 can access the displayed digital image 105 and can receive a user selection of a color 122 within the digital image 105. The selected color corresponds to the red (R), green (G) and blue (B) values at an image location 120 specified by the user as part of the received color selection 122. In some implementations, the RGB values corresponding to the selected color can represent the RGB values associated with the pixel at the specified image location 120. In other implementations, the RGB values corresponding to the selected color can represent average RGB values over a predetermined number of pixels adjacent to the specified image location 120. In FIG. 2A, the user can select a sky blue color via a multi-touch gesture 222 (e.g., a single tap) at a location 220 contained in a portion of the image 205 associated with the sky. Optionally, the GUI associated with the image processing application 200 can include color swatches to indicate the selected sky blue color 210 and its corresponding blue hue 212, respectively, at the image point 220 specified by the user via the color selection 222. Typical color adjustments can modify the hue of (a portion of) the image. The hue-approach to color adjustments can be unintuitive, because sometimes the underlying hue does not even resemble the color the user is trying to adjust. A reason for the discrepancy between a color and the underlying hue(s) is that hues represent saturated colors, as opposed to more muted, true colors that are typically depicted in an image 205. The muted true colors tend to be formed as combinations of several colors, e.g., browns, tans, etc. For example, in FIG. 2I, the user can select a tan color via a multi-touch gesture 230'

(e.g., a single tap) at a location 220' contained in a portion of the image 205 associated with the Arc de Triomphe. In this case, the color swatches displayed in the GUI associated with the image processing application 200 indicate the tan color 210' and its corresponding orange hue 212', respectively, at the image point 220' specified by the user via the color selection 230'.

Referring again to FIG. 1, upon receiving the color selection 122, the effect proponent module 125 can access a data store 126 configured to store a plurality of color effects and preset adjustments 128 to determine, from among the latter, color effects or preset adjustments or both that are applicable to the user selected color. In some implementations, the data store 128 can be local to the on-screen image adjustment utility 110. For example, the data store 128 can be stored on memory of the mobile device 102, and can be directly accessed by the effect proponent module 125. In some implementations, the data store 128 can be stored at a network location, e.g., in the cloud, and can be accessed by the effect proponent module 125 via network connections maintained by the mobile device 102. In either of these implementations, the data store 126 can be an XML file, a relational database, or the like.

Each of the color effects and of the preset adjustments 128 stored on the data store 126 represents a predefined combination that includes at least two color transformations. The color transformations included in a given combination and their relative proportions (weights) within the given combination depend on whether the effect or preset adjustment associated with the given combination is generic or color specific. A generic color effect or preset adjustment represents a predefined combination of color transformations that is applicable to any input color. When the generic color effect or preset adjustment is applied to an input color, e.g., the color selected by the user, the transformations combined in the generic effect or preset adjustment are being applied within a predefined, narrow range centered on a hue associated with the input color, e.g., ±3 degrees (or about ±1%) of the 360 degrees of hue space. In this fashion, the generic effect or preset adjustment modifies the input color and some (similar) colors near the input color. Examples of generic effects and preset adjustments are described below in connection with FIGS. 2B and 2F.

A color specific effect or preset adjustment includes color transformations combined in a way that is optimized for a specific color. Examples of specific colors are sky blue color, skin color, grass color, and the like. English names of these and other colors correspond to accepted hexadecimal or decimal RGB triplet values. For instance, the colors in the range from cyan to midnight blue and their respective hex and decimal RGB triplets are listed in Table 1.

TABLE 1

| RGB triplets and equivalent English color names | | |
|---|---|---|
| Blue/Cyan colors | Hex code RGB | Decimal code RGB |
| Aqua | 00 FF FF | 0 255 255 |
| Cyan | 00 FF FF | 0 255 255 |
| Light Cyan | E0 FF FF | 224 255 255 |
| Pale Turquoise | AF EE EE | 175 238 238 |
| Aquamarine | 7F FF D4 | 127 255 212 |
| Turquoise | 40 E0 D0 | 64 224 208 |
| Medium Turquoise | 48 D1 CC | 72 209 204 |
| Dark Turquoise | 00 CE D1 | 0 206 209 |
| Cadet Blue | 5F 9E A0 | 95 158 160 |
| Steel Blue | 46 82 B4 | 70 130 180 |
| Light Steel Blue | B0 C4 DE | 176 196 222 |

TABLE 1-continued

| RGB triplets and equivalent English color names | | |
|---|---|---|
| Blue/Cyan colors | Hex code RGB | Decimal code RGB |
| Powder Blue | B0 E0 E6 | 176 224 230 |
| Light Blue | AD D8 E6 | 173 216 230 |
| Sky Blue | 87 CE EB | 135 206 235 |
| Light Sky Blue | 87 CE FA | 135 206 250 |
| Deep Sky Blue | 00 BF FF | 0 191 255 |
| Dodger Blue | 1E 90 FF | 30 144 255 |
| Cornflower Blue | 64 95 ED | 100 149 237 |
| Royal Blue | 41 69 E1 | 65 105 225 |
| Blue | 00 00 FF | 0 0 255 |
| Medium Blue | 00 00 CD | 0 0 205 |
| Dark Blue | 00 00 8B | 0 0 139 |
| Navy | 00 00 80 | 0 0 128 |
| Midnight Blue | 19 19 70 | 25 25 112 |

Moreover, color specific effects to change sky blue are described below in connection with FIG. 2B. These sky blue specific effects are configured to transform the hue, saturation, and luminance values of the sky blue color by applying a gamma function and a luminance function to the sky blue color. For instance, a combination of (i) a transformation to increase gamma of the sky blue portion of the digital image, and (ii) a transformation to decrease luminance of the same image portion has the desired effect of making a deeper and more moody sky, as described below in connection with FIGS. 2B-2C.

Once it accessed the color effects and preset adjustments 128 stored in the data store 126, the effect proponent 125 can determine which ones of the foregoing are applicable to the selected color. For example, the effect proponent 125 can determine that all generic color effects and preset adjustments from among the stored color effects and preset adjustments 128 can be applied to the selected color. As another example, the effect proponent 125 can identify, from among the stored color effects and preset adjustments 128, the ones that are specific to and hence are applicable to the user selected color. As such, if the color, selected via the color selection 122 specified by the user at location 120, is skin color, then the effect proponent 125 can determine that color effects and preset adjustments stored in data store 126 that are applicable to the selected skin color include the generic ones and the skin color effects, preset adjustments or both.

Once it determines the color effects, preset adjustments or both applicable to the selected color, the effect proponent 125 can display superimposed on the digital image 105, a color control tool 130\* configured to cause change of the selected color within the digital image 105 in accordance with user input specifying movement 132 within the GUI. As shown in the inset 130 of FIG. 1, the color control tool 130\* can include "n" effect indicators 138-1, 138-2, . . . , 138-j, . . . , 138-n, each one indicating a color effect or preset adjustment, from among the respective determined color effects, preset adjustments or both, "1", "2", . . . , "j", . . . , "n", to be applied to the selected color in response to an associated predetermined movement 132 within the GUI. The "n" effect indicators 138-1, 138-2, . . . , 138-j, . . . , 138-n, that populate the color control tool 130\* can be distributed radially around a reference color indicator R-138. The reference color indicator R-138 can be common among the "n" effect indicators 138-1, 138-2, . . . , 138-j, . . . , 138-n, and indicates a color at the user specified image location 120 to be modified by applying one of the color effects, preset adjustments or both "1", "2", . . . , "j", . . . , "n", in response to the associated predetermined movement 132 within the GUI. A direction of the associated predetermined movement 132 is represented in the inset 130 by a directed ray associated with the one effect.

In some implementations, "n" represents the total number of color effects, preset adjustments or both, 1", "2", ..., "j", ..., "n", that are determined by the effect proponent 125 to be applicable to the user selected color. In other implementations, the "n" effect indicators that populate the color control tool 130* represent a predefined maximum quantity of effect indicators corresponding to "n" of "N" color effects, preset adjustments or both, 1", "2", ..., "n", ..., "N", that are determined by the effect proponent 125 to be applicable to the user selected color. In FIG. 2A, the image processing application 200 superimposes a color control tool 270 on the digital image 205, in response to a color selection 222, specified by the user at image point 220. The 4-point color control tool 270 includes n=4 effect indicators corresponding to 1-4 of N=8 color effects, preset adjustments or both that are applicable to the sky blue color specified by the user selection 222. Moreover, the user can toggle display of the "n" effect indicators and the remaining "N-n" effect indicators for the color control tool 130*. In FIG. 2E, the user can change display of the 1-4 of 8 effect indicators to display of the 5-8 of 8 effect indicators of the 4-point color control tool 270 by using a multi-touch gesture (e.g., a double tap 240) at the user specified location 220. The instance of the 4-point color control indicator 270 that includes the 5-8 of 8 effect indicators is referenced in FIG. 2E as the 4-point color control tool 280.

Referring again to FIG. 1, in some implementations, each one of the "n" effect indicators (e.g., 138-$j$) can include an associated new color indicator T-138-$j$ that indicates a new (or target) color to be obtained when applying the associated color effect or preset adjustment "j" to the selected color, in response to the associated predetermined movement 132 in the GUI. In this manner, the new color indicator T-138-$j$ can guide the user in selecting the effect "j" to be applied to the selected color at the image location 120 (the latter color being indicated by a reference color indicator R-138 displayed side-by-side to the new color indicator T-138-$j$, as part of the same effect indicator 138-$j$.) Optionally, each one of the "n" effect indicators can further include a label of the associated effect "j" to be applied in response to the associated predetermined movement in the GUI. In other implementations, each of one the "n" effect indicators (e.g., 138-$j$) can only include a label of the associated effect "j" to be applied in response to the associated predetermined movement 132 in the GUI, without including a new color indicator.

Figure 2B:
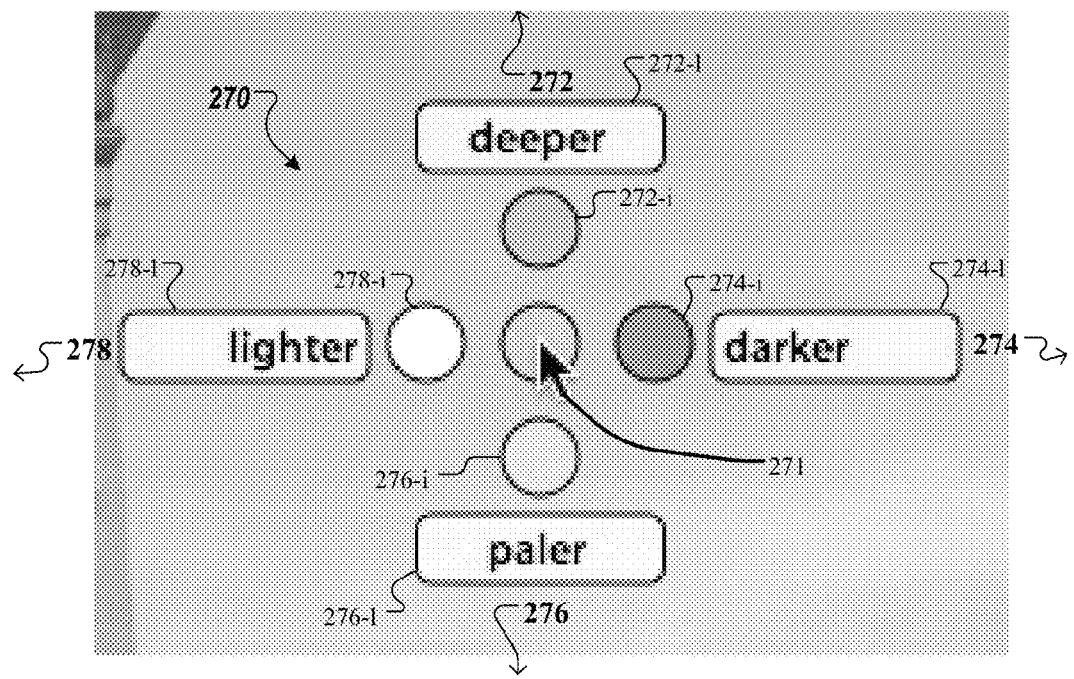

FIG. 2B shows a close-up of the 4-point color control tool 270. Respective instances 270 and 270' of this 4-point color control tool are superimposed in FIGS. 2A and 2I by the image processing application 200 on the digital image 205, in response to the color selections 222 and 222', specified by the user at image points 220 and 220'. The 4-point color control tool 270 includes four effect indicators 272, 274, 276 and 278. The effect indicator 272 corresponds to a generic color effect that changes an input color to a deeper color. The effect indicator 272 includes a reference color indicator 271 configured to indicate the input color, or the color to be changed to a deeper color. In FIG. 2A, the input color is the sky blue color specified by the user via the color selection 222 at the image location 220. In FIG. 2I, the input color is the tan color of the Arc de Triomphe specified by the user via the color selection 222' at the image location 220'. The effect indicator 272 further includes a new color indicator 272-$i$ configured to indicate the (target) deeper color obtained by changing the input color (indicated by the reference color indicator 271) when the user moves the effect indicator 272 upwards, in the direction indicated by the arrow associated with the numerical reference 272. As shown in Table 2, the deeper color effect associated with the effect indicator 272 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by increasing gamma and decreasing the luminance. The adjusted HSL triplet value of the image pixels can be further transformed to obtain the adjusted RGB triplet value. Moreover, the effect indicator 272 includes an effect label 272-I to spell out that the input color will be changed to a deeper color by moving the effect indicator 272.

TABLE 2

Effect indicators of 4-point color control tool 270

| Reference of effect indicator | Name of color effect or preset adjustment | Combination of transformations | Type |
|---|---|---|---|
| 272 | Deeper color | Increase gamma + decrease luminance | Generic |
| 276 | Paler color | Decrease gamma + increase luminance | Generic |
| 274 | Darker color | Decrease luminance + increase saturation | Generic |
| 278 | Lighter color | Increase luminance + decrease saturation | Generic |

The effect indicator 276 corresponds to a generic color effect that changes an input color to a paler color. The color effect associated with the effect indicator 276 is complementary to the color effect associated with the effect indicator 272, and in this example, the complementary effect indicators 272 and 276 are laid out along diametrically opposed directions within the 4-point color control tool 270. The effect indicator 276 includes the reference color indicator 271 configured to indicate the input color, or the color to be changed to a paler color. The effect indicator 276 further includes a new color indicator 276-$i$ configured to indicate the (target) paler color obtained by changing the input color (indicated by the reference color indicator 271) when the user moves the effect indicator 276 downwards, in the direction indicated by the arrow associated with the numerical reference 276. As shown in Table 2, the paler color effect associated with the effect indicator 276 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by decreasing gamma and increasing the luminance. The adjusted HSL triplet value of the image pixels can be further transformed to obtain the adjusted RGB triplet value. Moreover, the effect indicator 276 includes an effect label 276-I to spell out that the input color will be changed to a paler color by moving the effect indicator 276.

The effect indicator 274 corresponds to a generic color effect that changes an input color to a darker color. The effect indicator 274 includes the reference color indicator 271 configured to indicate the input color, or the color to be changed to a paler color. The effect indicator 274 further includes a new color indicator 274-$i$ configured to indicate the (target) darker color obtained by changing the input color (indicated by the reference color indicator 271) when the user moves the effect indicator 274 rightwards, in the direction indicated by the arrow associated with the numerical reference 274. As shown in Table 2, the darker color effect associated with the effect indicator 274 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by decreasing the luminance and increasing the saturation. The adjusted HSL triplet value of the image pixels can be further transformed to obtain the adjusted RGB triplet value. Moreover, the effect indicator 274 includes an effect label 274-I to spell out that the input color will be changed to a darker color by moving the effect indicator 274.

The effect indicator 278 corresponds to a generic color effect that changes an input color to a lighter color. The color effect associated with the effect indicator 278 is complementary to the color effect associated with the effect indicator 274, and in this example, the complementary effect indicators 274 and 278 are laid out along diametrically opposed directions within the 4-point color control tool 270. The effect indicator 278 includes the reference color indicator 271 configured to indicate the input color, or the color to be changed to a lighter color. The effect indicator 278 further includes a new color indicator 278-i configured to indicate the (target) lighter color obtained by changing the input color (indicated by the reference color indicator 271) when the user moves the effect indicator 278 leftwards, in the direction indicated by the arrow associated with the numerical reference 278. As shown in Table 2, the lighter color effect associated with the effect indicator 278 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by increasing the luminance and decreasing the saturation. The adjusted HSL triplet value of the image pixels can be further transformed to obtain the adjusted RGB triplet value. Moreover, the effect indicator 278 includes an effect label 278-I to spell out that the input color will be changed to a darker color by moving the effect indicator 278.

Figure 2F:
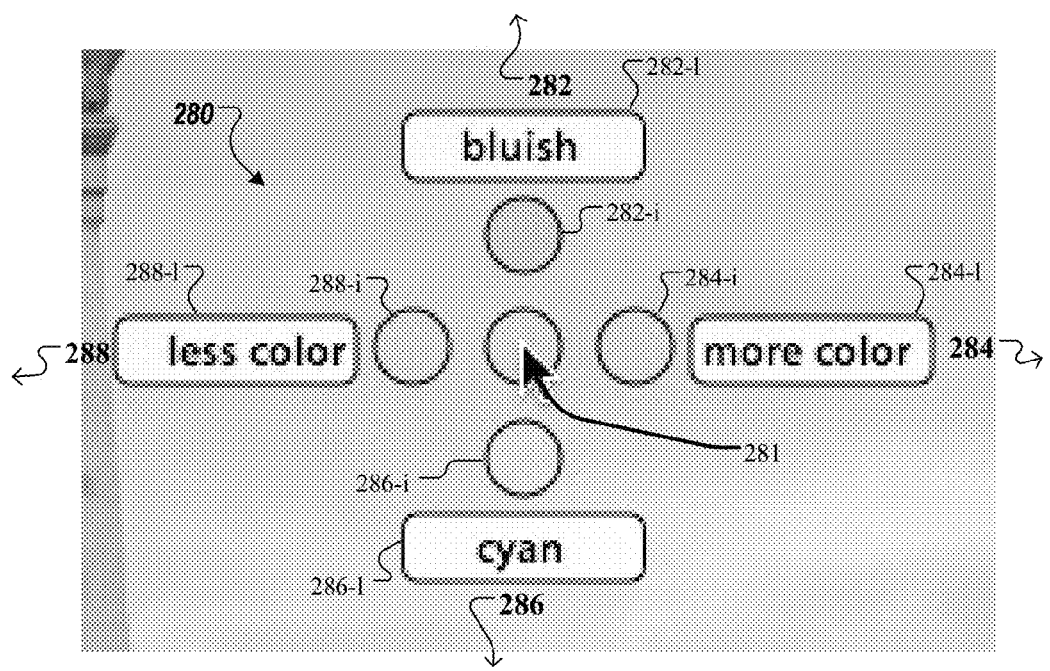
Figure 2C:
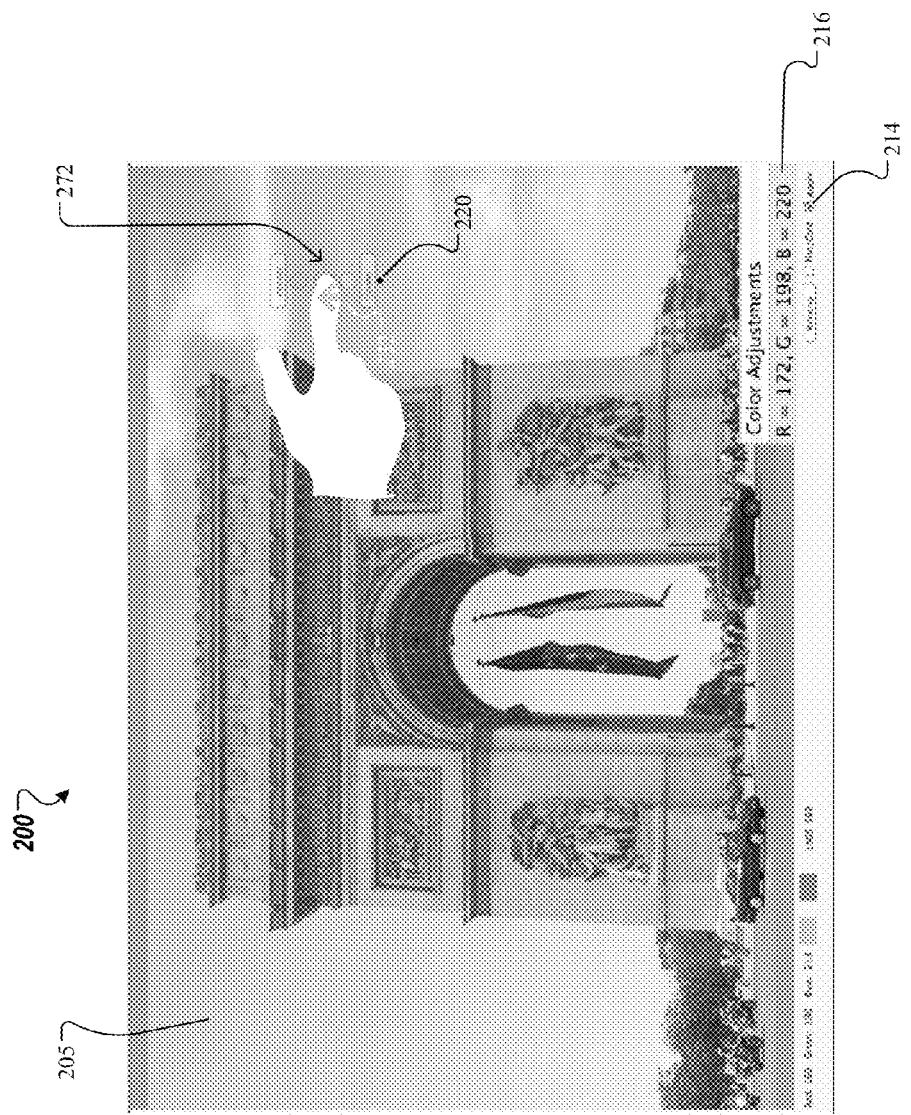
Figure 2D:
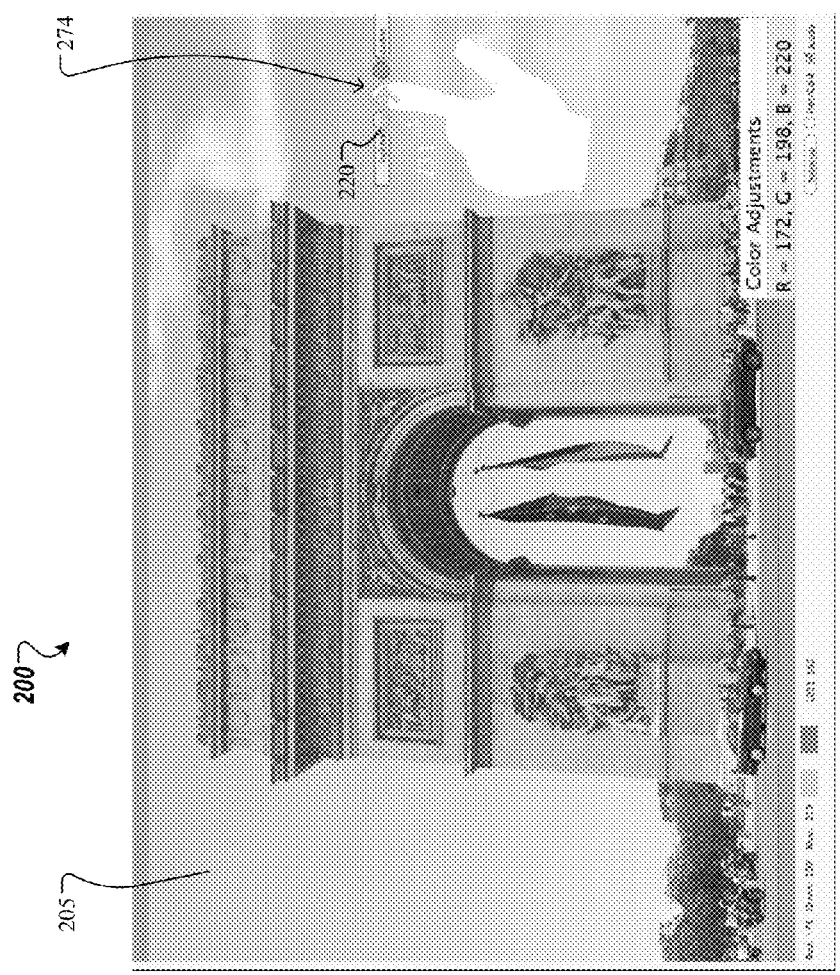
Figure 2E:
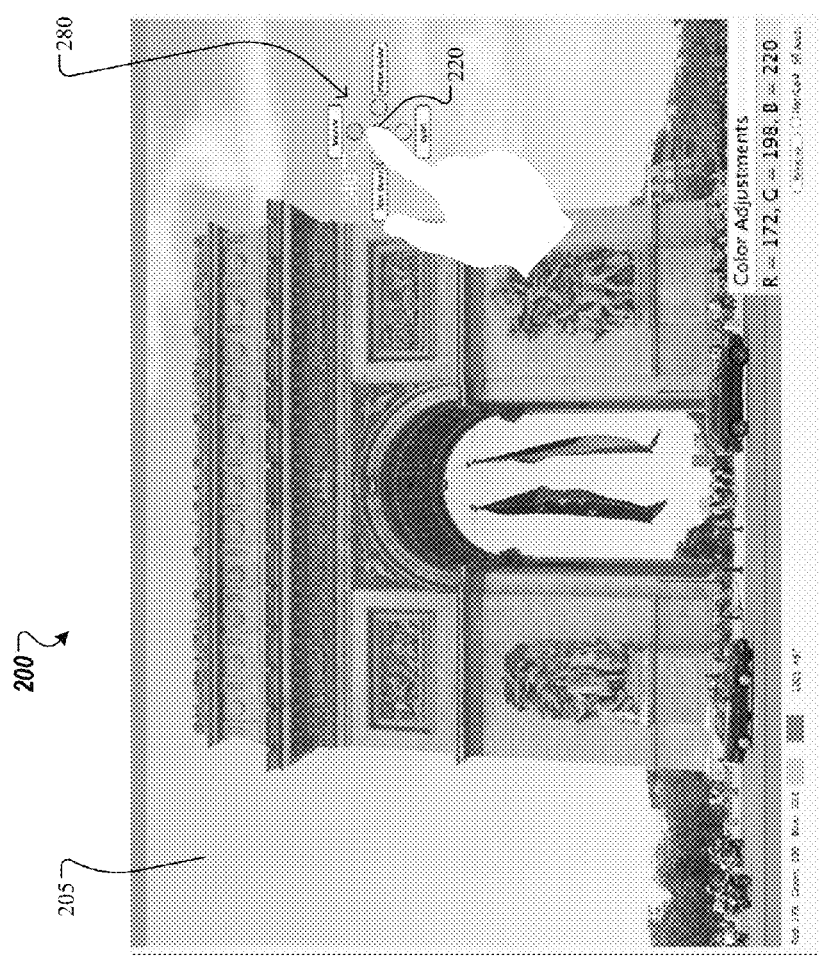

FIG. 2F shows a close-up of the 4-point color control tool 280. The 4-point color control tool 280, represents another instance of the 4-point color control tool 270, and is superimposed in FIG. 2E by the image processing application 200 on the digital image 205, in response to a user input 240. The 4-point color control tool 280 includes four effect indicators 282, 284, 286 and 288. The effect indicator 282 corresponds to a color specific effect that changes a sky blue color to a more bluish color. The effect indicator 282 includes a reference color indicator 281 configured to indicate the input sky blue color to be changed to a more bluish color. In FIG. 2E, the input color can be the previously changed sky blue color at the image location 220 obtained by applying the color effects 272 and 274 specified by the user via the effect selections 232 and 234, respectively. The effect indicator 282 further includes a new color indicator 282-i configured to indicate the (target) more bluish color obtained by changing the sky blue color (indicated by the reference color indicator 281) when the user moves the effect indicator 282 upwards, in the direction indicated by the arrow associated with the numerical reference 282. As shown in Table 3, the more bluish color effect associated with the effect indicator 282 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by increasing the hue value and increasing the saturation. The increase in hue value is capped to prevent wrap-around of the hue wheel. In this case, the blue hue of the sky blue color can be replaced with the neighboring indigo hue. The adjusted HSL triplet value of the image pixels can be further transformed to obtain the adjusted RGB triplet value. Moreover, the effect indicator 282 includes an effect label 282-I to spell out that the input color will be changed to a more bluish color by moving the effect indicator 282.

TABLE 3

Effect indicators of 4-point color control tool 280

| Reference of effect indicator | Name of color effect or preset adjustment | Combination of transformations | Type |
|---|---|---|---|
| 282 | More bluish color | Increase hue value (e.g., replacing the blue hue with an indigo hue) + Increase saturation | Sky blue specific |
| 286 | More cyanish color | Decrease hue value (e.g. replacing the blue hue with a cyan hue) + Increase saturation | Sky blue specific |
| 284 | More color | Increase hue value + increase color saturation + decrease luminance | Generic |
| 288 | Less color | Decrease hue value + increase color saturation + decrease luminance | Generic |

The effect indicator 286 corresponds to a color specific effect that changes a sky blue color to a more cyanish color. The color effect associated with the effect indicator 286 is complementary to the color effect associated with the effect indicator 282, and in this example, the complementary effect indicators 282 and 286 are laid out along diametrically opposed directions within the 4-point color control tool 280. The effect indicator 286 includes the reference color indicator 281 configured to indicate the input sky blue color, or the color to be changed to a more cyanish color. Note that the reference color indicator 281 is common among the effect indicators 282, 284, 286 and 288. The effect indicator 286 further includes a new color indicator 286-i configured to indicate the (target) more cyanish color obtained by changing the input sky blue color (indicated by the reference color indicator 281) when the user moves the effect indicator 286 downwards, in the direction indicated by the arrow associated with the numerical reference 286. As shown in Table 3, the more cyanish color effect associated with the effect indicator 286 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by decreasing the hue value and increasing the saturation. The decrease in hue value is capped to prevent wrap-around of the hue wheel. In this case, the blue hue of the sky blue color can be replaced with the neighboring cyan hue. The adjusted HSL triplet value of the image pixels can be further transformed to obtain the adjusted RGB triplet value. Moreover, the effect indicator 286 includes an effect label 286-I to spell out that the input color will be changed to a more cyanish color by moving the effect indicator 286.

The effect indicator 284 corresponds to a generic color effect that adds more color to an input color, e.g., changes the input color to a more saturated color. The effect indicator 284 includes the reference color indicator 281 configured to indicate the input color, or the color to be changed to a more saturated color. The effect indicator 284 further includes a new color indicator 284-$i$ configured to indicate the (target) more saturated color obtained by changing the input color (indicated by the reference color indicator 281) when the user moves the effect indicator 284 rightwards, in the direction indicated by the arrow associated with the numerical reference 284. As shown in Table 3, the more color effect associated with the effect indicator 284 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by increasing the hue value, increasing the saturation and decreasing the luminance. The adjusted HSL triplet value of the image pixels can be further transformed to obtain the adjusted RGB triplet value. Moreover, the effect indicator 284 includes an effect label 284-I to spell out that the input color will be changed to a more saturated color by moving the effect indicator 284.

The effect indicator 288 corresponds to a generic color effect that subtracts color from an input color, e.g., changes the input color to a less saturated color. The color effect associated with the effect indicator 288 is complementary to the color effect associated with the effect indicator 284, and in this example, the complementary effect indicators 284 and 288 are laid out along diametrically opposed directions within the 4-point color control tool 280. The effect indicator 288 includes the reference color indicator 281 configured to indicate the input color, or the color to be changed to a less saturated color. The effect indicator 288 further includes a new color indicator 288-$i$ configured to indicate the (target) less saturated color obtained by changing the input color (indicated by the reference color indicator 281) when the user moves the effect indicator 288 leftwards, in the direction indicated by the arrow associated with the numerical reference 288. As shown in Table 3, the less color effect associated with the effect indicator 288 is based on a combination of transformations and adjustments to be applied to the input color. An RGB triplet value corresponding to the input color is first transformed to obtain an equivalent hue-saturation-luminance (HSL) triplet value. The image pixels corresponding to the obtained HSL triplet value are further adjusted by decreasing the hue value, decreasing the saturation and decreasing the luminance. The adjusted HSL triplet value of the image pixels can be further transformed to obtain the adjusted RGB triplet value. Moreover, the effect indicator 288 includes an effect label 288-I to spell out that the input color will be changed to a less saturated color by moving the effect indicator 288.

The combinations of transformations and adjustments described above in connection with Tables 2 and 3 represent potential implementations or approaches to obtain the color effects or preset adjustments described in this specification. Other algorithms can be used to obtain the foregoing or other color effects or preset adjustments.

Referring again to FIG. 1, the on-screen image adjustment utility 110 can receive, via the color control tool 130\*, user input specifying a direction of movement 132 within the GUI relative to the "n" effect indicators of the color control tool 130\*. The user can specify the direction of movement 132 via a touch-swipe gesture or via either a touch- or a cursor-drag gesture along a radial direction, within the color control tool 130\*, associated with one of the "n" effect indicators (e.g., the effect indicator 138-$j$.) Upon receipt of the direction of movement 132 specifying the effect indicator 138-$j$, the effect applicator module 135 can change the selected color using the color effect or preset adjustment "j" indicated by the specified effect indicator 138-$j$. Additionally, the on-screen image adjustment utility 110 can update the display of the digital image 105' in real time to show a result of changing the selected color to match the new color indicator T-138-$j$ associated with effect indicator 138-$j$ specified by the user via the color control tool 130\*.

In some implementations, the effect applicator 135 can change the selected image color in all portions of the image 105 having the same color as the specified image point 120. In the example illustrated in FIG. 2C, the deeper sky blue effect associated with the effect indicator 272 can be applied to portions of the sky around the Arc de Triomphe and inside the Arc. In other implementations, the changes to the selected image color can be applied by the effect applicator 135 only to the portion of the image 105 that includes the specified image point 120. In the example illustrated in FIG. 2C, the deeper sky blue effect associated with the effect indicator 272 can be applied to a first portion of the sky around the Arc de Triomphe that includes the specified image point 220, but not to a second portion of the sky inside the Arc that is discontiguous from the first portion.

In some implementations, if the received user input is a swipe gesture 132 in the direction of the effect indicator 138-$j$, the effect applicator 135 can change the selected color by applying the entire (e.g., 100% or a maximum predefined magnitude of the color effect or preset adjustment "j", and can display the changed color as part of the adjusted digital image 105', in real time.

In other implementations, if the user input is a drag gesture 132 in the direction of the effect indicator 138-$j$, the effect applicator 135 can change the selected color by gradually applying the color effect or preset adjustment "j", in real time, as the length of the drag gesture 132 increases between first and second predefined lengths. In this manner, the application of the color effect or preset adjustment "j" can start only once the length of the drag gesture 132 exceeds the first predefined length. While the length of the drag gesture 132 increases beyond the first predefined length, a magnitude of the change in the selected color also increases based on the current length of the drag gesture 132, up to a maximum predefined magnitude of the color effect or preset adjustment "j". The latter corresponds to the second predefined length of the drag gesture 132. No additional change is being applied to the selected color by the effect applicator 135 when the length of the drag gesture 132 increases beyond the second predefined length.

Optionally, the on-screen image adjustment utility 110 can indicate that the first predefined length of the drag gesture 132 has been reached by removing at least some of the "n" effect indicators and retaining the effect indicator 138-$j$ associated with the specified direction of the drag gesture 132. Further, the on-screen image adjustment utility 110 can indicate that the second predefined length of the drag gesture 132 has been reached by removing the effect indicator 138-$j$ associated with the specified direction of the drag gesture 132. Moreover, prior to removing the effect indicator 138-$j$ associated with the specified direction of drag gesture 132, the on-screen image adjustment utility 110 can gradually fade the effect indicator 138-$j$ as the specified length of the drag gesture 132 increases from the first predefined length to the second predefined length. By gradually removing out-of-view portions of the color control tool 130\*, e.g., initially the effect indicators that are different from the specified effect indicator, and later even the specified effect indicator, the on-screen image adjustment utility 110 can reduce the intrusiveness of the color control tool 130*.

As described above in connection with FIG. 2A, the image processing application 200 can superimpose the 4-point color control tool 270 on the digital image 205, in response to the sky blue color selection 222, specified by the user at the image point 220, e.g., via a single-tap gesture. The 4-point color control tool 270, and its effect indicators are described above in connection with FIG. 2B. In FIG. 2C, the user can drag 232 the effect indicator 272 upward in the GUI of the image processing application 200. In some implementations, in response to the received drag gesture 232 selecting the effect indicator 272, the image processing application 200 can remove from the 4-point color control tool 270 (superimposed on the image 205 in FIG. 2A) the effect indicators corresponding to the darker and lighter color effects. In this manner, the 4-point color control tool 270 can convert into a 2-point color control tool that retains only the selected effect indicator 272 corresponding to the deeper color effect and the effect indicator corresponding to the complementary, paler color effect. By doing so, the image processing application 200 can reduce clutter and increase a fraction of the image 205 that is unobstructed by the full 4-point color control tool 270.

In other implementations, in response to the received drag gesture 232 selecting the effect indicator 272, the image processing application 200 can remove from the 4-point color control tool 270 (superimposed on the image 205 in FIG. 2A) the (horizontal) effect indicators corresponding to the darker and lighter color effects, and the (vertical) effect indicator corresponding to the paler color effect. In this manner, the 4-point color control tool 270 can convert into a 1-point color control tool that retains only the selected effect indicator 272 corresponding to the deeper color effect, in the example illustrated in FIG. 2C. Such a 1-point color control tool would just show the direction of the drag gesture 232, but would not show the opposite direction. In this fashion, if the user applies a drag-down gesture after applying a drag-up gesture, the color control tool can switch either to a 1-point down-direction control or to a 2-point vertical-direction control.

Also in response to the received drag gesture 232 selecting the effect indicator 272, the image processing application 200 can change the selected sky blue color to a deeper sky blue color that matches the new color indicator 272-i shown in FIGS. 2A-2B. The changed, deeper sky blue color of the image 205 can be displayed by the image processing application 200, in real time, while the user performs the drag gesture 232. The fraction of the change from the selected color (displayed in the reference color indicator 271) to the deeper sky blue color indicated by the new color indicator 272-i is proportional to the length of the upwards drag gesture 232.

Furthermore, as the user drags upward 232 the effect indicator 272, the image processing application 200 causes the 2-point color control tool to gradually fade out-of-view, and removes it completely after the effect indicator 272 has been dragged by a predetermined vertical distance from the specified point 220, e.g., when the changed, deeper sky blue color matches the new color indicator 272-i associated with the 4-point color control tool 270 depicted in FIGS. 2A-2B. By doing so, the image processing application 200 can further reduce clutter and present to the viewer the image 205 that is unobstructed by the 2-point color control tool associated with the effect indicator 272.

Upon receiving from the user the drag gesture 232 selecting the deeper color effect associated with the effect indicator 272, and prior to changing the selected color in accordance with the selected deeper color effect, the image processing application 200 can store the RGB values 216 corresponding to the selected color at the specified image location 220. In some implementations, the stored RGB values 216 can be displayed in the GUI associated with the image processing application 200. By storing the RGB values 216 corresponding to the selected color prior to applying the selected effect or preset adjustment, the image processing application 200 can undo a color change in response to a user input received via a control 214 displayed on the GUI associated with the image processing application 200. In addition to storing the RGB values 216, the image processing application also can store the direction and magnitude of the drag gesture 232. The stored information enables a user to effectively and efficiently modify previous edits. For instance, the user can reselect the image location 220 and continue adjusting, rather than having to apply new color effects or preset adjustments on top of the previously applied one(s).

Referring again to FIG. 1, the on-screen image adjustment utility 110 can receive a user input 142 requesting to return back to adjusting the color at the specified image point 120. For example, the user can request to reselect the previously selected effect. In this case, the effect applicator 135 can apply the reselected effect to the previously changed color. As another example, the user can request to select another effect different from the previously selected effect. In this case, the effect applicator 135 can apply the other selected effect to the previously changed color. In addition, the request 142 received from the user can include selection of another color at another specified point 120'. The effect proponent 125 can display superimposed on the digital image 105 another color control tool 130' including "k" effect indicators corresponding to color effects or preset adjustments or both applicable to the other selected color associated with the specified point 120', where k≠n. Once the on-screen image adjustment utility 110 receives user selection 132 of an applicable color effect or preset adjustment to apply to the other selected color, the effect applicator 135 can change the other selected color in accordance with the user selected color effect or preset adjustment.

In some implementations, the on-screen image adjustment utility 110 can apply multiple user selected color effects or preset adjustments or both, whether to a single color or to two or more different colors, in an additive manner with respect to the digital image 105. In other implementations, the on-screen image adjustment utility 110 can apply multiple user selected color effects or preset adjustments or both to respective multiple colors of the digital image in an additive manner with respect to the digital image. Additionally, the on-screen image adjustment utility 110 can apply the multiple user selected color effects or preset adjustments or both to a single color of the digital image in substitutive manner with respect to the digital image 105 (by replacing the previously applied color effect or preset adjustment with the currently applied color effect or preset adjustment.)

Returning to the examples illustrated in FIGS. 2A and 2C, after applying the deeper color effect corresponding to the effect indicator 272 selected by the user with the drag gesture 232, the image processing application 200 can receive another request 222 from the user (e.g., via a single-tap gesture) to superimpose the 4-point color control tool 270 at the image location 220, as illustrated in FIG. 2A. At that time, the user can drag 234 the effect indicator 274 rightward in the GUI of the image processing application 200, as shown in FIG. 2D. In response to the received drag gesture 234 selecting the effect indicator 274, the image processing application 200 can remove from the 4-point color control tool 270 (superimposed on the image 205 in FIG. 2A) the effect indicators corresponding to the deeper and paler color effects. In this manner, the 4-point color control tool 270 can convert into a 2-point color control tool that retains only the selected effect indicator 274 corresponding to the darker color effect and the effect indicator corresponding to the complementary, lighter color effect.

Also in response to the received drag gesture 234 selecting the effect indicator 274, the image processing application 200 can change the selected sky blue color to a darker sky blue color that matches the new color indicator 274-i shown in FIGS. 2A-2B. The changed darker sky blue color of the image 205 can be displayed by the image processing application 200 in real time, while the user performs the drag gesture 234. The fraction of the change from the selected color (displayed in the reference color indicator 271) to the darker sky blue color indicated by the new color indicator 274-i is proportional to the length of the rightward drag gesture 234.

Furthermore, as the user drags rightward 234 the effect indicator 274, the image processing application 200 causes the 2-point color control tool to gradually fade out-of-view and removes it completely after the effect indicator 274 has been dragged by a predetermined horizontal distance from the specified point 220, e.g., when the changed darker sky blue color matches the new color indicator 274-i associated with the 4-point color control tool 270 depicted in FIGS. 2A-2B.

Figure 2G:
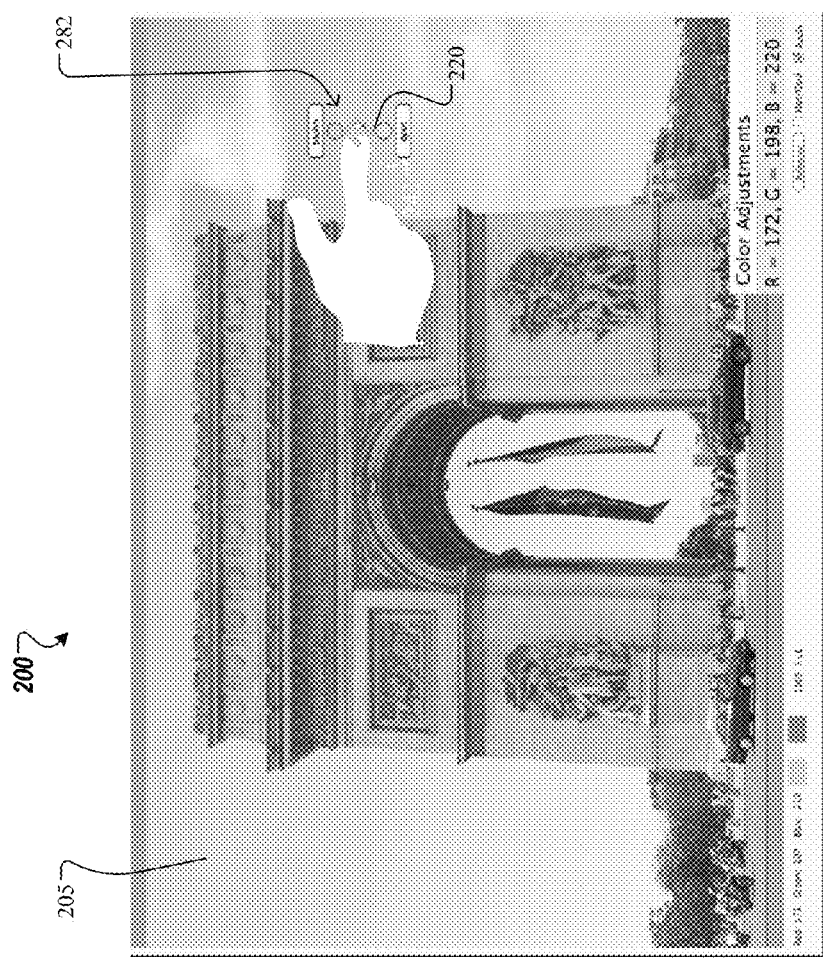

After applying the darker color effect corresponding to the effect indicator 274 selected by the user with the drag gesture 234, the image processing application 200 can receive another request 240 from the user (e.g., via a double-tap gesture) to superimpose the color control tool 280 at the image location 220, as illustrated in FIG. 2E. The 4-point color control tool 280, and its effect indicators are described above in connection with FIG. 2F. In FIG. 2G, the user can drag 242 the effect indicator 282 upward in the GUI of the image processing application 200. In response to the received drag gesture 242 selecting the effect indicator 282, the image processing application 200 can remove from the 4-point color control tool 280 (superimposed on the image 205 in FIG. 2E) the effect indicators corresponding to the color effects providing more or less color. In this manner, the 4-point color control tool 280 can convert into a 2-point color control tool that retains only the selected effect indicator 282 corresponding to the bluish color effect and the effect indicator corresponding to the complementary, cyanish color effect.

Also in response to the received drag gesture 242 selecting the effect indicator 282, the image processing application 200 can change the selected sky blue color to a more bluish sky color that matches the new color indicator 282-i shown in FIGS. 2E-2F. The changed more bluish sky color of the image 205 can be displayed by the image processing application 200, in real time, while the user performs the drag gesture 242. The fraction of the change from the selected color (displayed in the reference color indicator 281) to the more bluish sky color indicated by the new color indicator 282-i is proportional to the length of the upwards drag gesture 242.

Furthermore, as the user drags upward 242 the effect indicator 282, the image processing application 200 causes the 2-point color control tool to gradually fade out-of-view and removes it completely after effect indicator 282 has been dragged by a predetermined vertical distance from the specified point 220, e.g., when the changed more bluish sky color matches the new color indicator 282-i associated with the 4-point color control tool 280 depicted in FIGS. 2E-2F.

Figure 2H:
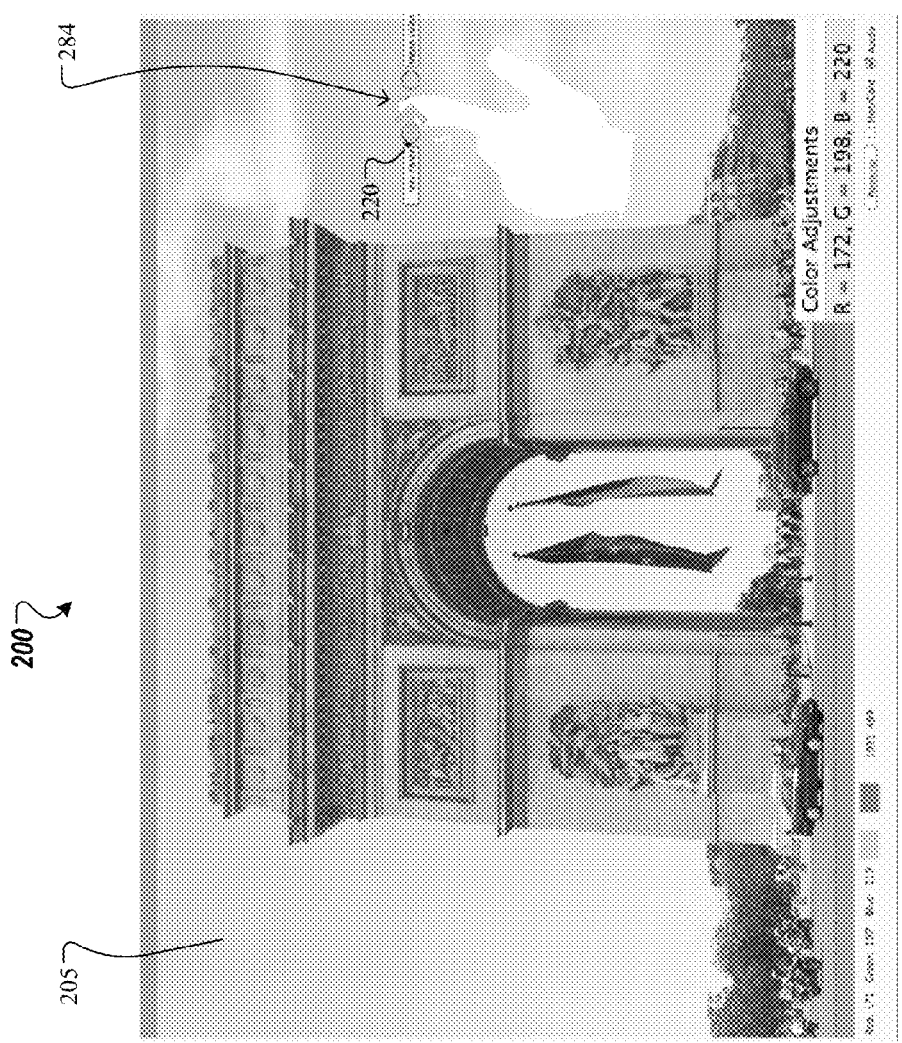
Figure 21:
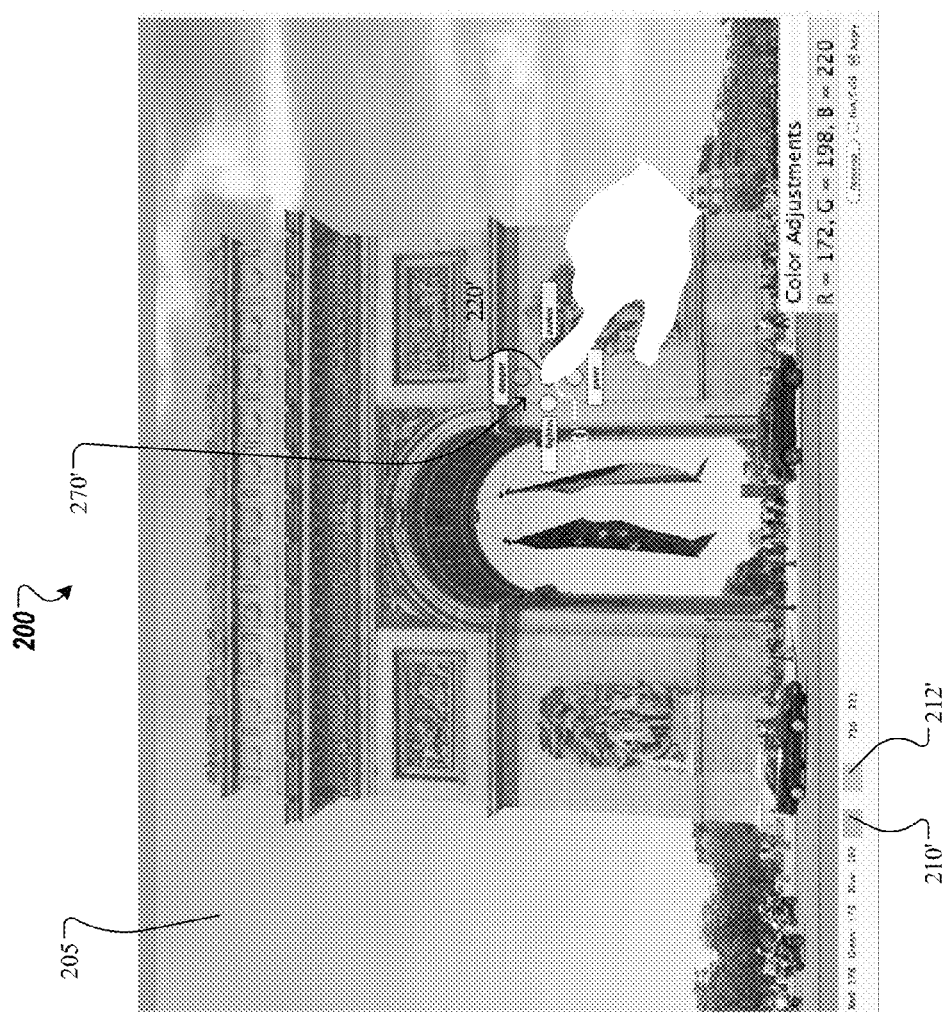

After applying the bluish color effect corresponding to the effect indicator 282 selected by the user with the drag gesture 242, the image processing application 200 can receive another request 240 from the user (e.g., via a double-tap gesture) to superimpose the 4-point color control tool 280 at the image location 220, as illustrated in FIG. 2E. At that time, the user can drag 244 the effect indicator 284 rightward in the GUI of the image processing application 200, as shown in FIG. 2H. In response to the received drag gesture 244 selecting the effect indicator 284, the image processing application 200 can remove from the 4-point color control tool 280 (superimposed on the image 205 in FIG. 2E) the effect indicators corresponding to the bluish and cyanish color effects. In this manner, the 4-point color control tool 280 can convert into a 2-point color control tool that retains only the selected effect indicator 284 corresponding to the more saturated color effect and the effect indicator corresponding to the complementary, less saturated color effect.

Also in response to the received drag gesture 244 selecting the effect indicator 284, the image processing application 200 can change the selected sky blue color to a more saturated sky blue color that matches the new color indicator 284-i shown in FIGS. 2E-2F. The changed more saturated sky blue color of the image 205 can be displayed by the image processing application 200, in real time, while the user performs the drag gesture 244. The fraction of the change from the selected color (displayed in the reference color indicator 281) to the more saturated sky blue color indicated by the new color indicator 284-i is proportional to the length of the rightward drag gesture 244.

Furthermore, as the user drags rightward 244 the effect indicator 284, the image processing application 200 causes the 2-point color control tool to gradually fade out-of-view and removes it completely after effect indicator 284 has been dragged by a predetermined horizontal distance from the specified point 220, e.g., when the changed, more saturated sky blue color matches the new color indicator 284-i associated with the 4-point color control tool 280 depicted in FIGS. 2E-2F.

Figure 2J:
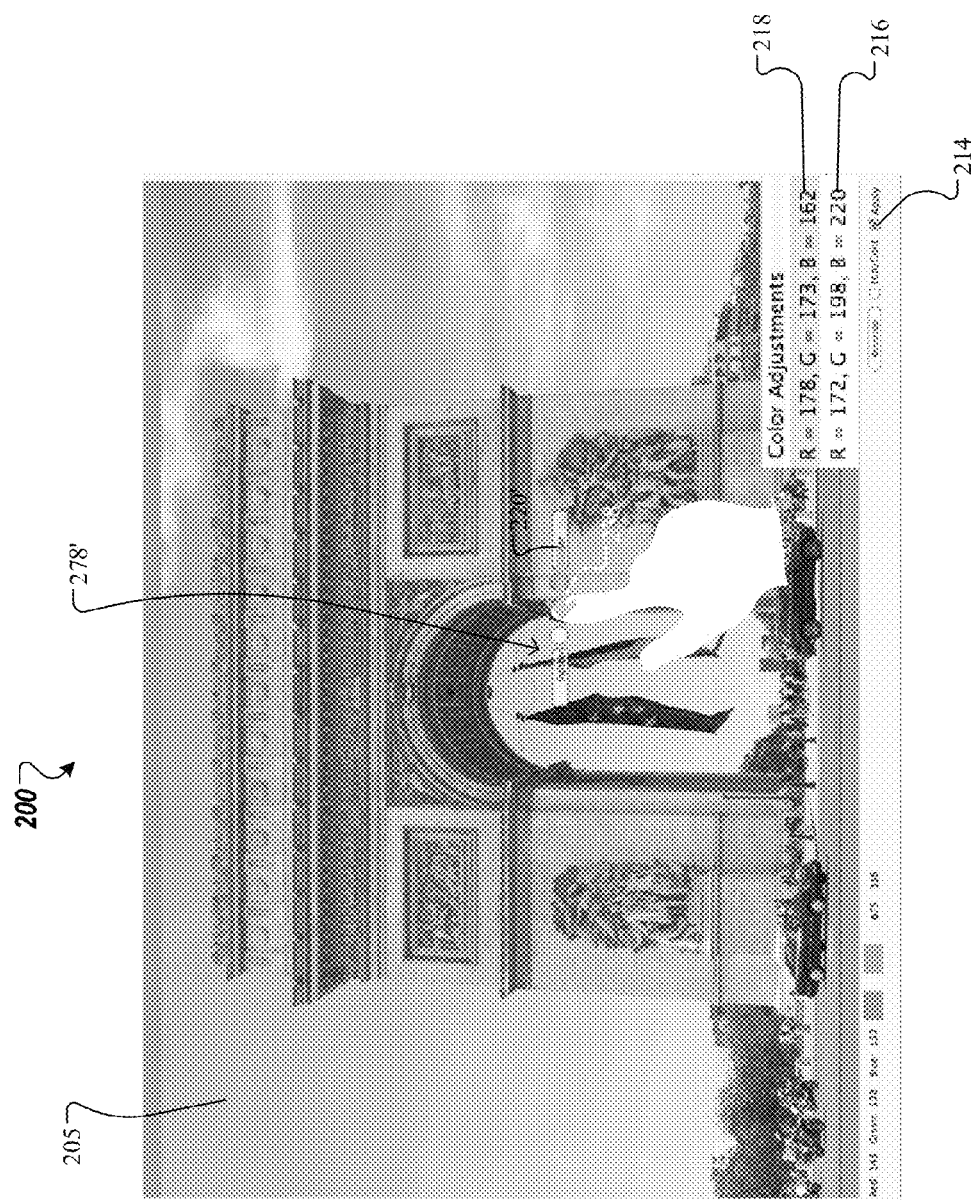

In FIG. 2I, the image processing application 200 can superimpose another instance of the 4-point color control tool 270 (from here on referred to as the 4-point color control tool 270') on the digital image 205, in response to the tan color selection 230, specified by the user at the image point 220', e.g., via a single-tap gesture. The 4-point color control tool 270', and its effect indicators are described above in connection with FIG. 2B. In FIG. 2J, the user can drag 238 the effect indicator 278' leftward in the GUI of the image processing application 200. In response to the received drag gesture 238 selecting the effect indicator 278', the image processing application 200 can remove from the 4-point color control tool 270' (superimposed on the image 205 in FIG. 2I) the effect indicators corresponding to the deeper and paler color effects. In this manner, the 4-point color control tool 270' can convert into a 2-point color control tool that retains only the selected effect indicator 278' corresponding to the lighter color effect and the effect indicator corresponding to the complementary, darker color effect.

Also in response to the received drag gesture 238 selecting the effect indicator 278', the image processing application 200 can change the selected tan color to a lighter tan color that matches an associated new color indicator shown in FIG. 2I. The changed, lighter tan color of the image 205 can be displayed by the image processing application 200, in real time, while the user performs the drag gesture 238. The fraction of the change from the selected color (displayed in the reference color indicator shown at the center of the 4 point color control tool 270' in FIG. 2I) to the lighter tan color indicated by the associated new color indicator is proportional to the length of the leftward drag gesture 238.

Furthermore, as the user drags leftward 238 the effect indicator 278', the image processing application 200 causes the 2-point color control tool to gradually fade out-of-view and removes it completely after effect indicator 278' has been dragged by a predetermined horizontal distance from the specified point 220', e.g., when the changed, lighter tan color matches the associated new color indicator depicted in FIG. 2I.

Upon receiving from the user the drag gesture 238 selecting the lighter color effect associated with the effect indicator 278', and prior to changing the selected tan color in accordance with the selected lighter color effect, the image processing application 200 can store the RGB values 218 corresponding to the selected tan color at the specified image location 220'. In some implementations, the stored RGB values 218 corresponding to the selected tan color at the specified image location 220' can be displayed in the GUI associated with the image processing application 200, along with the stored RGB values 216 corresponding to the selected sky blue color at the specified image location 220. By storing the RGB values 216 and 218, corresponding to the selected colors at respective specified image locations 220 and 220', prior to applying the respective selected color effects or preset adjustments, the image processing application 200 can undo either one of the respective color changes. For example, to undo a color effect or preset adjustment applied to one of the two selected color, the user can first select the displayed RGB values associated with the one of the two selected colors, and then can unselect the control 214 displayed on the GUI associated with the image processing application 200.

In this fashion, the technologies described in connection with systems 100 and 200 provide a simple and intuitive color adjustment mechanism operable by a user who is unfamiliar with hue, luminance, saturation, brightness, and other color transformations. The foregoing concepts are known in color science but are unknown to most users. In addition, the disclosed technologies can be executed on mobile devices for which, typically, display real estate come for a premium.

Figure 3:
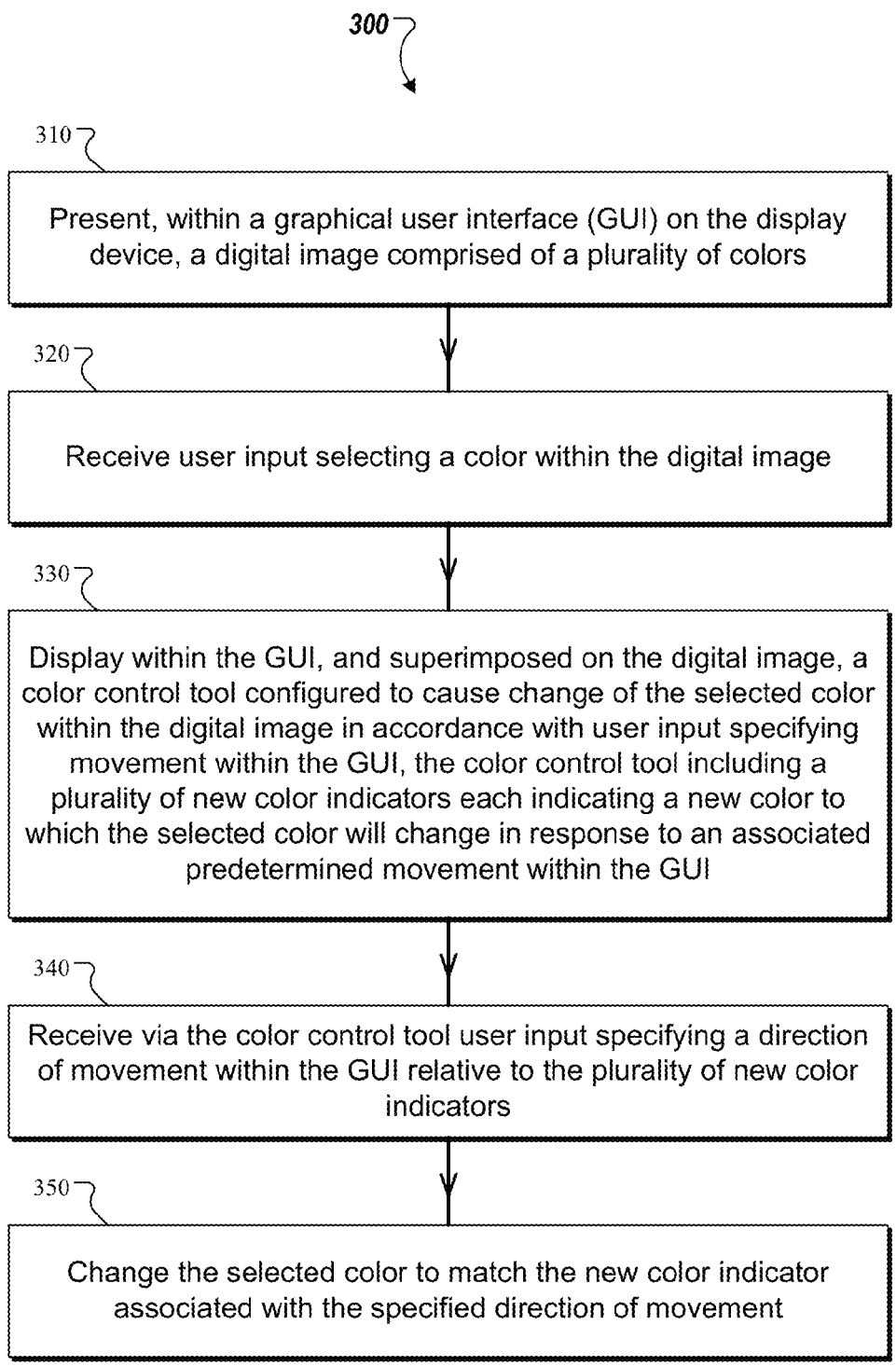
FIG. 3 shows an example of a method for applying color effects within an on-screen image adjustment environment.

FIG. 3 shows an example of a method for applying color effects and preset adjustments or both to a digital image within an on-screen image adjustment environment. In some implementations, the method 300 can be executed by one or more computing appliances, for example by the mobile device 102 in conjunction with system 100 (or 200), to perform color adjustments of a digital image. For instance, the process 300 can be applied to a digital image displayed in a predetermined region of a user interface of an image processing application by using a color control tool overlaid on the digital image.

At 310, a digital image including of a plurality of colors is presented within a graphical user interface (GUI) on a display device. In some implementations, the image processing application, with which the GUI is associated, can detect one or more colors of the digital image for which color effects and preset adjustments are available. In such implementations, the image processing application can mark on the digital image the detected one or more colors to indicate to the user that the marked one or more colors can be changed.

At 320, user input selecting a color within the digital image is received. In some implementations, the user can select the color based on self-assessment. In other implementations, the user can select the color from among the one or more colors marked by the image processing application, as described above at 310. The color selection can be provided by the user via touch gestures (e.g., single-tap, double-tab, etc.), or via a mouse/keyboard input.

At 330, a color control tool is displayed within a graphical user interface (GUI) and superimposed on the digital image being manipulated. The color control tool is configured to cause change of a selected color within the digital image in accordance with user input specifying movement within the GUI. Further, the color control tool includes a plurality of new color indicators each indicating a new color to which the selected color will change in response to an associated predetermined movement within the GUI. For each one of the plurality of new color indicators, a new color indicated by a new color indicator is obtained from the selected color by applying an associated color effect or a preset adjustment of a plurality of color effects and preset adjustments corresponding to the plurality of respective new color indicators. Each one of the plurality of color effects or preset adjustments can include two or more color transformations that are combined in an associated predefined proportion. For example, the two or more color transformations combined in the associated predefined proportion include either of gamma, luminance, saturation, contrast, or brightness adjustments. Moreover, the associated predetermined movement within the GUI, responsible for changing the selected color to the new color, corresponds to application of an associated effect to the selected color.

In some implementations, the displayed color indicator tool is superimposed on a portion of the image that includes the selected color. In some implementations, the image processing application can access, from among a plurality of effects stored on storage, multiple color effects and preset adjustments applicable to the selected color. As such, the color control tool can be populated, by the image processing application, with respective multiple new color indicators corresponding to the accessed multiple color effects and preset adjustments applicable to the selected color. Moreover, all the multiple new color indicators that populate the color control tool can be displayed in the GUI associated with the image processing application. Alternatively, the image processing application can concurrently display in the GUI only a predefined quantity of the multiple new color indicators that populate the color control tool. In some implementations, the image processing application can retrieve, from among the plurality of color effects and preset adjustments stored on the storage, only a predefined quantity of the color effects and preset adjustments, applicable to the selected color, equal to the predefined quantity of new color indicators associated with the color control tool to be displayed in the GUI.

At 340, user input specifying a direction of movement within the GUI relative to the plurality of new color indicators is received via the color control tool. In some implementations, the plurality of new color indicators can be distributed radially around a reference location. The specified direction of the associated predetermined movement with respect to the reference location represents selection of an effect to be applied to the selected color. Additionally, a length of the associated predetermined movement represents a magnitude of the effect selected to be applied to the selected color. The user can specify the direction and the length of the associated predetermined movement by using a drag gesture input via a touch-sensitive display or a mouse/keyboard.

At 350, the selected color is changed to match the new color indicator associated with the specified direction of movement. In some implementations, the digital image display can be updated in real time to show a result of changing the selected color to match the new color indicator associated with the received user input via the color control tool. The received user input selecting the color within the digital image can indicate an image pixel having the selected color. In some implementations, the selected color is changed only within a contiguous portion of the image that includes the indicated pixel. In other implementations, the selected color is changed throughout the image, for example, within all contiguous portions of the image that include pixels having the selected color.

Figure 4:
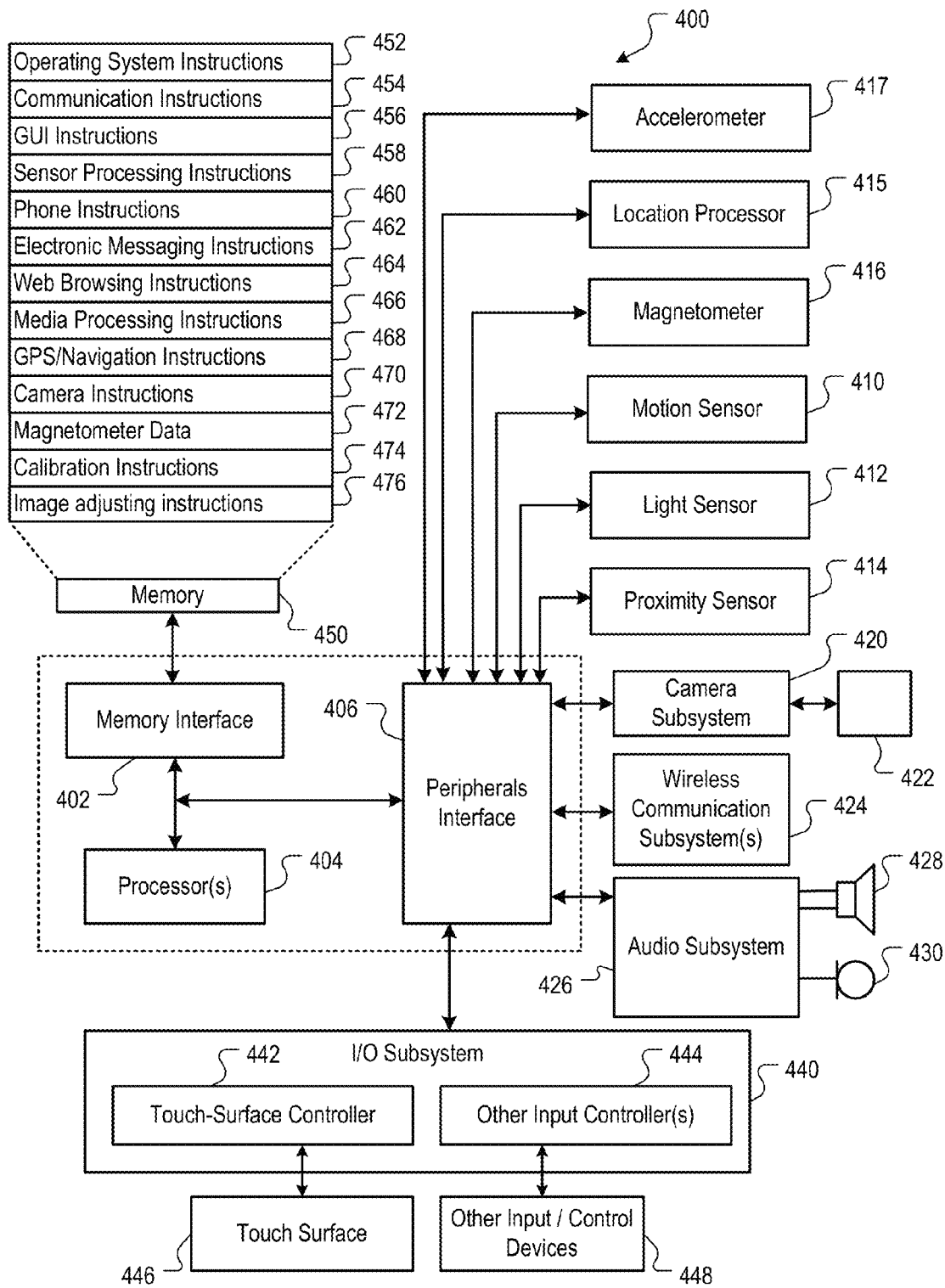
FIG. 4 is a block diagram of an example of a mobile device operated according to the technologies described above in connection with FIGS. 1-3.

FIG. 4 is a block diagram of an example of a mobile device 400 operated according to the technologies described above in connection with FIGS. 1-3. For example, a mobile device that can be configured to perform the technologies disclosed in this specification is the smart phone 102 described above in connection with FIG. 1. The mobile device 400 can include memory interface 402, one or more data processors, image processors and/or processors 404, and peripherals interface 406. Memory interface 402, one or more processors 404 and/or peripherals interface 406 can be separate components or can be integrated in one or more integrated circuits. Processors 404 can include one or more application processors (APs) and one or more baseband processors (BPs). The application processors and baseband processors can be integrated in one single process chip. The various components in mobile device 400, for example, can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the mobile device. Location processor 415 (e.g., GPS receiver) can be connected to peripherals interface 406 to provide geopositioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass. Accelerometer 417 can also be connected to peripherals interface 406 to provide data that can be used to determine change of speed and direction of movement of the mobile device.

Camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which a mobile device is intended to operate. For example, a mobile device can include communication subsystems 424 designed to operate over a GSM network, a GPRS network, an EDGE network, a Wi-Fi or WiMax network, and a Bluetooth network. In particular, the wireless communication subsystems 424 can include hosting protocols such that the mobile device can be configured as a base station for other wireless devices.

Audio subsystem 426 can be coupled to a speaker 428 and a microphone 430 to facilitate voice-enabled functions, such as voice recognition, voice replication, digital recording, and telephony functions.

I/O subsystem 440 can include touch surface controller 442 and/or other input controller(s) 444. Touch-surface controller 442 can be coupled to a touch surface 446 (e.g., a touch screen or touch pad). Touch surface 446 and touch surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 446.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In some implementation, a pressing of the button for a first duration may disengage a lock of the touch surface 446; and a pressing of the button for a second duration that is longer than the first duration may turn power to mobile device 400 on or off. The user may be able to customize a functionality of one or more of the buttons. The touch surface 446 can, for example, also be used to implement virtual or soft buttons and/or a keyboard, such as a soft keyboard on a touch-sensitive display.

In some implementations, mobile device 400 can present recorded audio and/or video files, such as MP3, AAC, and MPEG files. In some implementations, mobile device 400 can include the functionality of an MP3 player, such as an iPod™. Mobile device 400 may, therefore, include a pin connector that is compatible with the iPod. Other input/output and control devices can also be used.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate Global Navigation Satellite System (GNSS) (e.g., GPS) and navigation-related processes and instructions; camera instructions 470 to facilitate camera-related processes and functions; magnetometer data 472 and calibration instructions 474 to facilitate magnetometer calibration. The memory 450 may also store other software instructions (not shown), such as security instructions, web video instructions to facilitate web video-related processes and functions, and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 450. Memory 450 can include integrated color adjustment instructions 476 that can include preset adjustments, generic and specific effects, and other related functions described with respect to FIGS. 1-3.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A non-transitory computer storage medium encoded with a computer program, the program comprising instructions that, when executed by data processing apparatus of a mobile device, cause the mobile device to perform operations comprising:
   presenting, within a graphical user interface (GUI) of the mobile device, a digital image comprised of a plurality of colors;
   receiving user input selecting a location within the digital image, the selected location having a color;
   in response to the receiving of the user input selecting the location, displaying within the GUI, and superimposed on the selected location within the digital image, a color control tool configured to cause change of the color of the selected location within the digital image in accordance with user input specifying movement within the GUI, the color control tool including a reference color indicator indicating the color of the selected location, the reference color indicator being surrounded by a plurality of new color indicators, each new color indicator including a new color to which the color of the selected location will change in response to an associated predetermined movement in the GUI from the reference color indicator toward the new color indicator;
   receiving via the color control tool user input specifying a direction and a length of movement within the GUI from the reference color indicator toward one of the plurality of new color indicators, such that a magnitude of the change of the color of the selected location is determined based on the specified length of the movement; and
   changing, while the specified length of the movement is between first and second predefined lengths, the color of the selected location within the digital image to match a new color included in the one of the plurality of new a color indicators associated with the specified direction of movement, wherein as part of said changing,
      indicating that the first predefined length of the specified movement has been reached by removing the plurality of new color indicators except for the new color indicator associated with the specified direction of movement, and
      indicating that the second predefined length of the specified movement has been reached by removing the new color indicator associated with the specified direction of movement.

2. The non-transitory computer storage medium of claim 1, where
   for each one of the plurality of new color indicators, the new color indicated by the one new color indicator is obtained from the color of the selected location by applying an associated color effect of a plurality of color effects corresponding to the plurality of respective new color indicators, each one of the plurality of color effects comprising two or more color transformations that are combined in an associated predefined proportion, and
   the plurality of new color indicators includes a plurality of labels, each label of a respective new color indicator including a corresponding color effect from among the plurality of color effects to be applied in response to the associated predetermined movement in the GUI, wherein the plurality of labels surround the reference color indicator.

3. The non-transitory computer storage medium of claim 1, where the operations further comprise updating a display in real time to show a result of said changing the color of the selected location in response to the received user input via the color control tool.

4. The non-transitory computer storage medium of claim 1, where the operations further comprise, prior to said removing the new color indicator associated with the specified direction of movement, gradually fading the displayed color control tool as the specified length of the movement increases from the first predefined length to the second predefined length.

5. The non-transitory computer storage medium of claim 1, wherein the color control tool is centered on the selected location within the digital image.

6. The non-transitory computer storage medium of claim 1, wherein the user input selecting the location within the digital image comprises a touch input, and wherein an outer boundary of the reference color indicator encompasses an area within the digital image in which the touch input is received.

7. A method performed by one or more processes executing on a computer system, the method comprising:
   presenting, within a graphical user interface (GUI) of a mobile device, a digital image comprised of a plurality of colors;
   receiving user input selecting a location within the digital image, the selected location having a color;

in response to the receiving of the user input selecting the location, displaying, within the GUI and superimposed on the selected location within the digital image, a color control tool configured to cause change of the color of the selected location within the digital image in accordance with user input specifying movement within the GUI, the color control tool including a reference color indicator indicating the color of the selected location, the reference color indicator being surrounded by a plurality of new color indicators, each new color indicator including a new color to which the color of the selected location will change in response to an associated predetermined movement within the GUI from the reference color indicator toward the new color indicator;

receiving via the color control tool user input specifying a direction and a length of movement within the GUI from the reference color indicator toward one of the plurality of new color indicators, such that a magnitude of the change of the color of the selected location is determined based on the specified length of the movement; and changing, while the specified length of the movement is between first and second predefined lengths, the color of the selected location within the digital image to match a new color included in the one of the plurality of new color indicators associated with the specified direction of movement, wherein as part of said changing, indicating that the first predefined length of the specified movement has been reached by removing the plurality of new color indicators except for the new color indicator associated with the specified direction of movement, and indicating that the second predefined length of the specified movement has been reached by removing the new color indicator associated with the specified direction of movement.

8. The method of claim 7, further comprising updating a display in real time to show a result of said changing the color of the selected location within the digital image to match the new color indicator associated with the received user input via the color control tool.

9. The method of claim 7 where, for each one of the plurality of new color indicators, the new color indicated by the one new color indicator is obtained from the color of the selected location by applying an associated color effect of a plurality of color effects corresponding to the plurality of respective new color indicators, each one of the plurality of color effects comprising two or more color transformations that are combined in an associated predefined proportion.

10. The method of claim 9, where the two or more color transformations combined in the associated predefined proportion comprise either of gamma, luminance, saturation, contrast or brightness adjustments.

11. A system comprising:
a mobile device display; and
at least one processor and storage configured to store instructions that, when executed by the processor, cause the system to perform operations comprising:
   presenting, within a graphical user interface (GUI) on the mobile device display, a digital image comprised of a plurality of colors,
   receiving user input selecting a location within the digital image, the selected location having a color, and
   in response to the receiving of the user input selecting the location, displaying within the GUI, and superimposed on the selected location within the digital image, a color control tool configured to cause change of the color of the selected location within the digital image in accordance with user input specifying movement within the GUI, the color control tool including a reference color indicator indicating the color of the selected location, the reference color indicator being surrounded by a plurality of new color indicators, each new color indicator including a new color to which the color of the selected location will change in response to an associated predetermined movement within the GUI from the reference color indicator toward the new color indicator;

receiving via the color control tool user input specifying a direction and a length of movement within the GUI from the reference color indicator toward one of the plurality of new color indicators, such that a magnitude of the change of the color of the selected location is determined based on the specified length of the movement; and changing, while the specified length of the movement is between first and second predefined lengths, the color of the selected location within the digital image to match a new color included in the one of the plurality of new color indicators associated with the specified direction of movement, wherein as part of said changing, indicating that the first predefined length of the specified movement has been reached by removing the plurality of new color indicators except for the new color indicator associated with the specified direction of movement, and indicating that the second predefined length of the specified movement has been reached by removing the new color indicator associated with the specified direction of movement.

12. The system of claim 11, where
the received user input selecting the location comprises an indication of an image pixel at the selected location having the color of the selected location, and
said changing the color of the selected location is performed only within a contiguous portion of the image including the indicated pixel.

13. The system of claim 11, where the associated predetermined movement within the GUI, responsible for changing the color of the selected location to the new color, corresponds to application of an associated color effect to the color of the selected location, where the associated color effect includes a predefined combination of two or more color adjustments.

14. The system of claim 13, where the two or more color adjustments associated with the predefined combination are either of gamma, luminance, saturation, contrast, brightness or saturation adjustments.

15. The system of claim 13, where the operations further comprise:
   accessing, from among a plurality of color effects stored on the storage, multiple color effects, preset adjustments or both applicable to the color of the selected location,
   populating the color control tool with respective multiple new color indicators corresponding to the accessed multiple color effects, preset adjustments or both applicable to the color of the selected location, and
   concurrently displaying a predefined quantity of the multiple new color indicators that populate the color control tool.

16. The system of claim 13, where the operations further comprise:
   accessing, from among a plurality of color effects and preset adjustments stored on the storage, a predefined quantity of color effects, preset adjustments or both applicable to the color of the selected location, and concurrently displaying the predefined quantity of new color indicators corresponding to the accessed multiple color effects, preset adjustments or both applicable to the color of the selected location.

17. The system of claim 13, where the plurality of new color indicators is distributed radially around the reference color indicator location.

\* \* \* \* \*